(12) United States Patent
Kanno

(10) Patent No.: US 9,529,160 B2
(45) Date of Patent: Dec. 27, 2016

(54) OPTICAL CONNECTOR

(71) Applicant: FUJIKURA, LTD., Tokyo (JP)

(72) Inventor: Shuhei Kanno, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/685,721

(22) Filed: Apr. 14, 2015

(65) Prior Publication Data

US 2015/0293310 A1    Oct. 15, 2015

(30) Foreign Application Priority Data

Apr. 14, 2014 (JP) ................... 2014-082838
Apr. 14, 2014 (JP) ................... 2014-082842
Apr. 15, 2014 (JP) ................... 2014-083589

(51) Int. Cl.
*G02B 6/36* (2006.01)
*G02B 6/38* (2006.01)

(52) U.S. Cl.
CPC ........... *G02B 6/3882* (2013.01); *G02B 6/3847* (2013.01); *G02B 6/3891* (2013.01); *G02B 6/3885* (2013.01); *G02B 6/3893* (2013.01)

(58) Field of Classification Search
CPC ............................ G02B 6/3891; G02B 6/3882
See application file for complete search history.

(56) References Cited

U.S. PATENT DOCUMENTS

| | | | |
|---|---|---|---|
| 4,339,165 A * | 7/1982 | Malsot ................. | G02B 6/3816 439/139 |
| 6,206,579 B1 | 3/2001 | Selfridge et al. | |
| 6,250,818 B1 | 6/2001 | Loughlin et al. | |
| 7,341,381 B2 * | 3/2008 | Shimoji ............... | G02B 6/3893 385/60 |
| 7,785,019 B2 | 8/2010 | Lewallen et al. | |
| 8,757,894 B2 * | 6/2014 | Katoh ................. | G02B 6/3885 385/78 |
| 2006/0204178 A1 | 9/2006 | Theuerkorn et al. | |
| 2008/0050072 A1 * | 2/2008 | Durrant ............... | G02B 6/32 385/74 |
| 2008/0253717 A1 * | 10/2008 | Cull ..................... | G02B 6/383 385/54 |

(Continued)

FOREIGN PATENT DOCUMENTS

| | | |
|---|---|---|
| EP | 0128768 A2 | 12/1984 |
| JP | 58-159506 U | 10/1983 |

(Continued)

OTHER PUBLICATIONS

Communication dated Sep. 18, 2015 from the European Patent Office issued in corresponding application No. 15163181.9.

(Continued)

*Primary Examiner* — Rhonda Peace
(74) *Attorney, Agent, or Firm* — Sughrue Mion, PLLC

(57) ABSTRACT

An optical connector, including: a coupling device that is made of metal, and that is to be coupled to a coupling mechanism of another optical connector that is to be coupled with the optical connector; a ferrule; a housing that is made of resin and that is accommodated by the coupling device while accommodating the ferrule in such a manner that the ferrule can move rearward; and a metal member that is affixed to the coupling device while holding the housing between the metal member and the coupling device.

9 Claims, 19 Drawing Sheets

(56) References Cited

U.S. PATENT DOCUMENTS

| | | | |
|---|---|---|---|
| 2009/0305542 A1* | 12/2009 | Masuzaki | H01R 13/625 439/335 |
| 2010/0043159 A1 | 2/2010 | Fujiwara | |
| 2010/0215322 A1* | 8/2010 | Matsumoto | G02B 6/3879 385/78 |
| 2011/0189876 A1* | 8/2011 | Schneider | G02B 6/3887 439/271 |
| 2011/0211792 A1 | 9/2011 | Koreeda et al. | |
| 2013/0209041 A1* | 8/2013 | Szilagyi | B29D 11/0075 385/78 |
| 2014/0079356 A1 | 3/2014 | Pepin et al. | |
| 2015/0293310 A1* | 10/2015 | Kanno | G02B 6/3891 385/78 |
| 2016/0085035 A1* | 3/2016 | Volker et al. | G02B 6/3893 385/60 |
| 2016/0085036 A1* | 3/2016 | Kanno | G02B 6/3891 385/60 |

FOREIGN PATENT DOCUMENTS

| | | |
|---|---|---|
| JP | 2005-010726 A | 1/2005 |
| JP | 2010-164997 A | 7/2010 |
| JP | 2011-112751 A | 6/2011 |
| JP | 2012-003157 A | 1/2012 |
| WO | 2007127213 A2 | 11/2007 |

OTHER PUBLICATIONS

Communication dated Apr. 11, 2016, issued by the U.S. Patent and Trademark Office in corresponding U.S. Appl. No. 14/960,717.

Communication dated Jul. 12, 2016, issued by the Canadian Intellectual Property Office in corresponding Canadian Application No. 2,887,523.

Communication dated Jul. 14, 2016, issued by the European Patent Office in corresponding European Application No. 16165221.9.

* cited by examiner

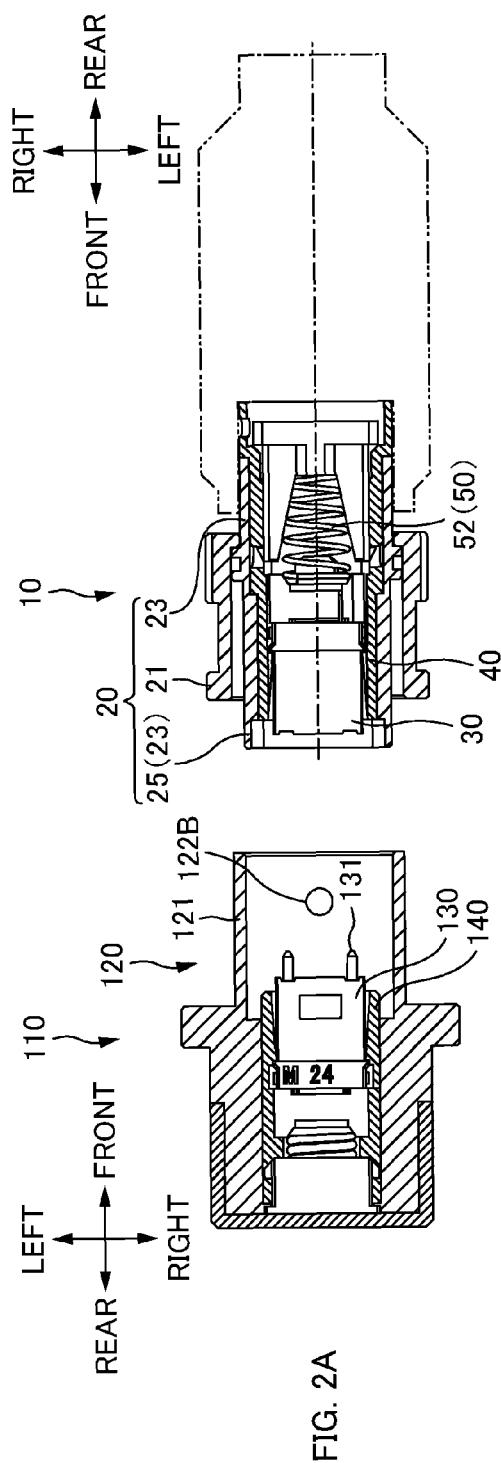
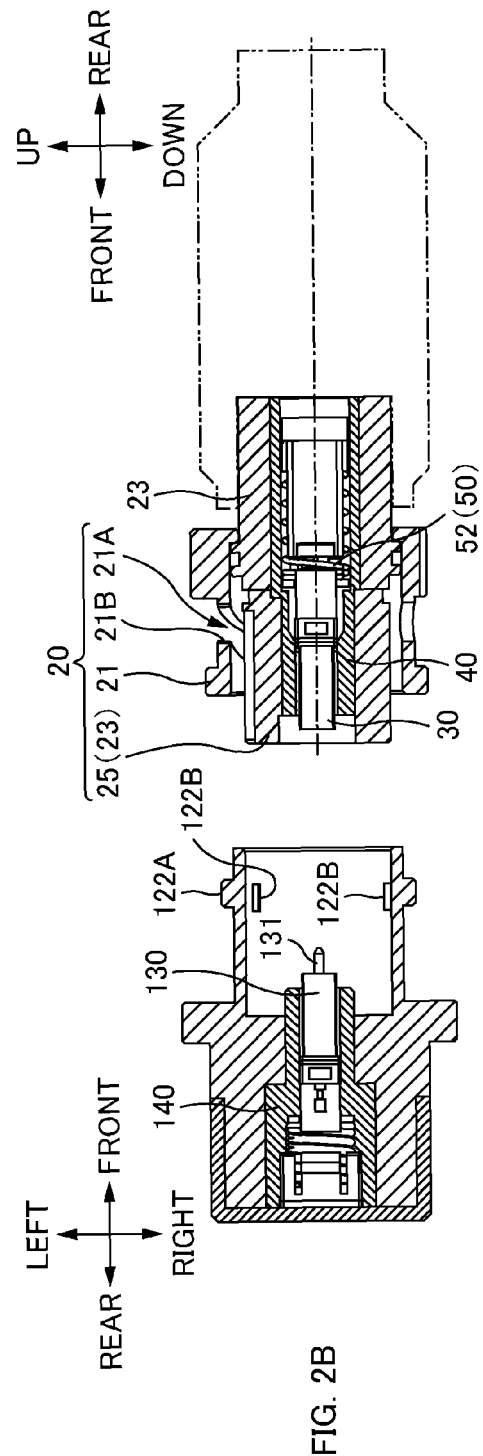
FIG. 2A
FIG. 2B (REFERENCE EXAMPLE)

(SECOND EMBODIMENT)

(FIRST MODIFIED EXAMPLE)

(SECOND MODIFIED EXAMPLE)

ABSTRACT
OPTICAL CONNECTOR

CROSS-REFERENCE TO RELATED APPLICATIONS

The present application claims priority from Japanese Patent Application Nos. 2014-082842 and 2014-082838 filed on Apr. 14, 2014, and Japanese Patent Application No. 2014-083589 filed on Apr. 15, 2014, which are herein incorporated by reference.

BACKGROUND

Technical Field

The present invention relates to an optical connector.

Related Art

As optical connectors in which a ferrule is accommodated in such a manner that the ferrule can move rearward, an MPO connector (F12 type optical connector prescribed in JIS C5981), for example, has been known. By accommodating the ferrules in such a manner that the ferrules can move rearward, the end faces of the ferrules physically meet each other at a certain force when connecting optical connectors, and as a result, optical fibers are coupled to each other.

As optical connectors including a ferrule, optical connectors, for example, described in Patent Literatures 1 to 3 have also been known.

CITATION LIST

Patent Literature

Patent Literature 1 U. S. Application Publication No. 2013/0209041
Patent Literature 2 U.S. Pat. No. 7,785,019
Patent Literature 3 U.S. Pat. No. 6,206,579

TECHNICAL PROBLEM

Since well-known optical connectors (e.g., an MPO connector) are not intended for frequent attaching/detaching, a coupling mechanism for coupling optical connectors to each other is, in some cases, composed of parts made of resin. However, if the coupling mechanism is composed of such resin parts, when the optical connector is repeatedly attached/detached, the coupling mechanism made of resin is worn, so that the durability of the optical connector deteriorates (the allowable number of attaching/detaching decreases).

As opposed thereto, it can be considered that employing a coupling mechanism made of metal improves the durability of the coupling mechanism. For example, if a coupling device used in electric connectors (e.g., a coupling device of a BNC connector) is employed, the coupling device is expected to withstand thousands times of attaching/detaching, based on the long-term experience of such a coupling device. But, whereas the durability of the coupling mechanism improves, the durability of the optical connector deteriorates due to wear of the ferrule which is accommodated in such a manner that the ferrule can move rearward, the wear being caused by hitting of such a metal coupling device with the ferrule, which are repeated every time when the optical connector is attached/detached.

SUMMARY

An advantage of some aspects of the present invention is to improve the durability of a ferrule which is accommodated by an optical connector in such a manner that the ferrule can move rearward and to improve the durability of the ferrule even if a metal coupling device is employed in the optical connector.

An aspect of the invention to achieve the above advantage is an optical connector, including: a coupling device that is made of metal and that is to be coupled to a coupling mechanism of another optical connector that is to be coupled with the optical connector; a ferrule; a housing that is made of resin and that is accommodated by the coupling device while accommodating the ferrule in such a manner that the ferrule can move rearward; and a metal member that is affixed to the coupling device while holding the housing between the metal member and the coupling device.

Other features of the present invention will become clear through the following description and the accompanying drawings.

EFFECTS OF THE INVENTION

According to the invention, the durability of a ferrule which is accommodated in an optical connector in such a manner that the ferrule can move rearward can improve even if a metal coupling device is employed in the optical connector.

BRIEF DESCRIPTION OF THE DRAWINGS

FIG. 1A is a perspective view of a receptacle-side optical connector 110, and FIG. 1B is a perspective view of a plug-side optical connector 10.

FIGS. 2A and 2B are cross-sectional views of optical connectors 10 and 110.

FIG. 9A is its front view, and FIG. 9B is a cross-sectional view of it.

DESCRIPTION OF EXEMPLARY EMBODIMENTS

Figure 1A:
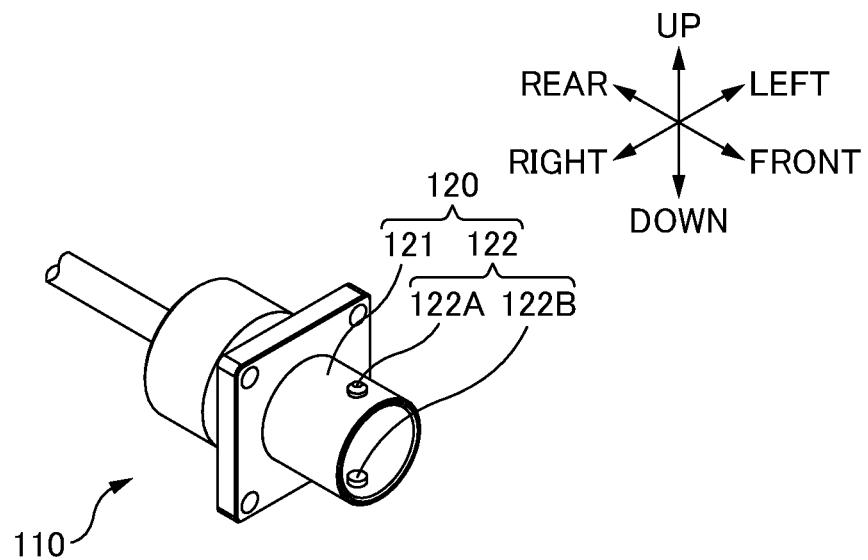
FIGS. 1A and 1B are explanatory diagrams of an optical connector system.

At least the following matters will be made clear by the following description of the present specification and the accompanying drawings.

(1) An optical connector, including: a coupling device that is made of metal and that is to be coupled to a coupling mechanism of another optical connector that is to be coupled with the optical connector; a ferrule; a housing that is made of resin and that is accommodated by the coupling device while accommodating the ferrule in such a manner that the ferrule can move rearward; and a metal member that is affixed to the coupling device while holding the housing between the metal member and the coupling device. With such an optical connector, the durability of a ferrule which is accommodated in an optical connector in such a manner that the ferrule can move rearward can improve even if a metal coupling device is employed in the optical connector.

It is desirable that a metal pin affixes between the coupling device and the metal member. This enables the coupling device and the metal member to be affixed by a metal part, and as a result, the durability improves.

It is desirable that the metal pin is placed perpendicular to a direction of attaching/detaching. This makes it possible to maintain high durability even if the optical connector is subject to force when attaching/detaching.

It is desirable that when a side closer to the end face of the ferrule is defined as front and the opposite side is defined as rear, an alignment surface which faces rearward is formed in an accommodating section of the coupling device, the accommodating section accommodating the housing. And, it is also desirable that a contact surface that faces forward is formed on the housing, and that the housing is accommodated by the coupling device while the contact surface being in contact with the alignment surface. Since the contact surface is in contact with the alignment surface, the contact surface of the resin housing is less likely to wear even when the optical connector is repeatedly attached/detached.

It is desirable that a difference between a Young's modulus of the housing and a Young's modulus of the ferrule is smaller than a difference between a Young's modulus of the coupling device and the Young's modulus of the ferrule. This improves the durability of the ferrule.

(3) Cleaning tools have been known which clean a connecting end face of an optical connector. For example, a cleaning tool described in Japanese Patent Application Laid-open Publication No. 2010-164997 cleans a connecting end face of an optical connector by pushing its cleaning unit against the connecting end face of the optical connector (the end face of a ferrule) using the head on the tip.

Note that, Japanese Unexamined Utility Model Application Publication No. S58-159506 describes a protection cap which protects the contact point of the optical connector.

In order to cause the cleaning unit and the connecting end face of the optical connector to precisely face each other, it is possible to attach an attachment to the tip end of the cleaning tool described in Japanese Patent Application Laid-open Publication No. 2010-164997. However, if the attachment is attached to the cleaning tool, it is necessary to replace the attachment depending on an optical connector which is to be cleaned. In some cases, cleaning operations are not efficient.

As an attachment in order to solve the problem, the following attachment will be described. That is, an attachment including an attachment main body which can be attached to an optical connector ferrule, and the attachment main body includes a guiding hole formed thereon, the guiding hole guiding an end section of the cleaning tool which cleans the ferrule. With such an attachment, it is not necessary for an attachment to be attached to and detached from the cleaning tool.

It is desirable that the optical connector further includes a cap for covering the guiding hole. This makes it possible to prevent the ferrule from being contaminated.

It is desirable that the optical connector further includes a linking section which links the attachment main body and the cap. This makes it possible to prevent the loss of the removed cap.

It is desirable that a keyway is formed in the guiding hole, the keyway being for mating with a protuberance formed on an end section of the cleaning tool. This makes it possible to prevent misalignment between the cleaning unit of the cleaning tool and ferrule of the optical connector.

It is desirable that the optical connector is a female connector, that the attachment main body includes a fitted section which is fitted inside the optical connector, and that the guiding hole is formed in the fitted section. This can prevent the protruding of the attachment from the end of the optical connector when the attachment is attached to the optical connector.

It is desirable that the optical connector is a male connector including an inserted section which is inserted into a female connector, and that the attachment main body includes: a guiding section in which the guiding hole is formed; and a fitted section which is fitted outside the inserted section of the optical connector. This enables guiding hole of the attachment main body to guide an end section of the cleaning tool even though the attachment cannot be placed inside the inserted section in which the ferrule is placed.

A method for cleaning an optical connector will be clear, the method including: attaching an attachment to an optical connector including a ferrule; and cleaning the ferrule of the optical connector with a cleaning tool by causing a guiding hole formed on the attachment to guide an end section of the cleaning tool. With such a method for cleaning an optical connector, it is not necessary for an attachment to be attached to and detached from the cleaning tool.

EMBODIMENTS

Before the description of the configuration of an optical connector (a plug-side optical connector) of the present embodiment, an outline of an optical connector system, which also includes a receptacle-side optical connector, will be described.

Outline of Optical Connector System

Figure 1B:
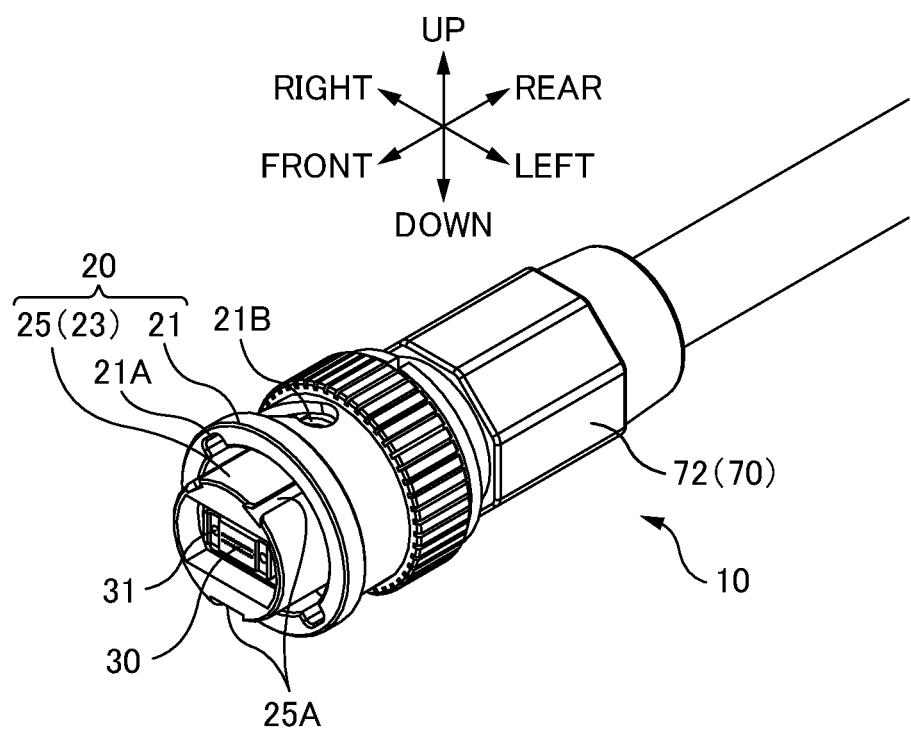

FIGS. 1A and 1B are explanatory diagrams of an optical connector system. FIG. 1A is a perspective view of a receptacle-side optical connector 110, and FIG. 1B is a perspective view of a plug-side optical connector 10. FIGS. 2A and 2B are cross-sectional views of optical connectors 10 and 110. As shown in FIGS. 2A and 2B, optical connector system includes: the receptacle-side optical connector 110; and the plug-side optical connector 10.

In the following description, the directions are defined as shown in the figures. That is, the "front-rear direction" is defined along a direction in which the connector is attached or detached: the side of the end face of each ferrule (the side closer to a mating optical connector) is defined as "front", and the opposite side as "rear". The "left-right direction" is defined along a direction in which the long sides of a rectangular end face of the ferrule extend: the right side when viewed from the rear toward the front is defined as "right", and the opposite side as "left". A direction perpendicular to the front-rear direction and the left-right direction is defined as the "up-down direction".

The receptacle-side optical connector 110 includes: a coupling device 120; a ferrule 130; and a housing 140. The plug-side optical connector 10, as in the receptacle-side one, includes: a coupling device 20; a ferrule 30; and a housing 40.

The coupling devices 20 and 120 are each a metal coupling section (also referred to as a coupling mechanism, or a connecting mechanism). The coupling devices 20 and 120 are for coupling the optical connectors 10 and 110 to each other, and a BNC type coupling device, which is used in electric coaxial connectors, is employed in these embodiments. The present invention is, however, not limited to the BNC type coupling device, and it is possible to use a screw style coupling device. There are screw style coupling devices, which are rotated by hand or by a spanner, etc., and any type of coupling devices may be employed. In addition, a slide-on style coupling device, which is easy to attach/detach, may be employed.

The receptacle-side coupling device 120 includes: a cylindrical main body 121; and a projection 122. Into the cylindrical main body 121, the inserted section 25 of a plug-side coupling device 20 is inserted. The projection 122 includes: an outer projection 122A which protrudes outwardly from the outer surface of the main body 121; and an inner projection 122B which protrudes inwardly from the inner surface of the main body 121.

The plug-side coupling device 20 includes: a rotation section 21; and an outer housing 23 (the inserted section 25). The rotation section 21 is a cylindrical portion which is rotatable outside the outer housing 23 (the inserted section 25). In the rotation section 21, receiving sections 21A and an anchor section 21B are formed. The outer housing 23 is a metal housing which accommodates the housing 40, and has the inserted section 25 formed in the front side thereof. The inserted section 25 is a portion which is inserted into the receptacle-side main body 121. On the outer surface of the inserted section 25, grooves 25A are formed along the front-rear direction.

When the plug-side coupling device 20 is connected to the receptacle-side coupling device 120, the outer projections 122A on the receptacle side pass through the receiving sections 21A of the rotation section 21 while rotating the rotation section 21, and the outer projections 122A are anchored by the anchor section 21B. And, while mating the inner projections 122B placed on the receptacle side with grooves 25A placed on the plug side, the inserted section 25 placed on the plug side is inserted into the receptacle-side main body 121, and the plug-side optical connector 10 is thereby aligned to the receptacle-side optical connector 110 (alignment in the up-down direction and the left-right direction; and alignment in the direction of rotation about the front-rear direction).

The ferrules 30 and 130 are members which hold a plurality of optical fibers, and are MT type (Mechanically Transferable) optical connectors (F12 type optical connector prescribed in JIS C5981) in these embodiments. Guide pins 131 protrude from an end face of the receptacle-side ferrule 130. The tip of each guide pin 131 (the front end) is located on the rear side with respect to the front edge of the receptacle-side coupling device 120, and the receptacle-side ferrule 130 is located on the rear side with respect to the front edge of the receptacle-side coupling device 120. Also, the plug-side ferrule 30 is located on the rear side with respect to the front edge of the plug-side coupling device 20 (the inserted section 25).

The housing 140 is a member which accommodates the ferrule 130 in such a manner that the ferrule can move rearward and is accommodated by the coupling device 120. In the inner space of the housing 140, protrusions are formed. While the flange of the ferrule 130 engages the protrusions, the ferrule 130 is pushed forward by the reaction force of the coil spring of a floating mechanism.

By coupling the receptacle-side coupling device 120 and the plug-side coupling device 20 to each other, the receptacle-side optical connector 110 is connected to the plug-side optical connector 10. When coupling the plug-side coupling device 20 to the receptacle-side coupling device 120, the guide pins 131 protruding from the end face of one of the two ferrules (herein the receptacle-side ferrule 130) are inserted in the guide holes 31 of the other ferrule (herein the plug-side ferrule 30); the ferrules 30 and 130 are thereby positioned. Then, the end faces of the ferrules 30 and 130 meet to each other, and this makes the end faces of the optical fibers to physically meet to each other. Consequently, the optical fibers are optically connected. Since the end faces of the optical fibers meet to each other at a certain force, the ferrules 30 and 130, which are respectively accommodated by the housings 40 and 140, can move rearward with the floating mechanism.

Configuration of Plug-Side Optical Connector 10

Figure 3:
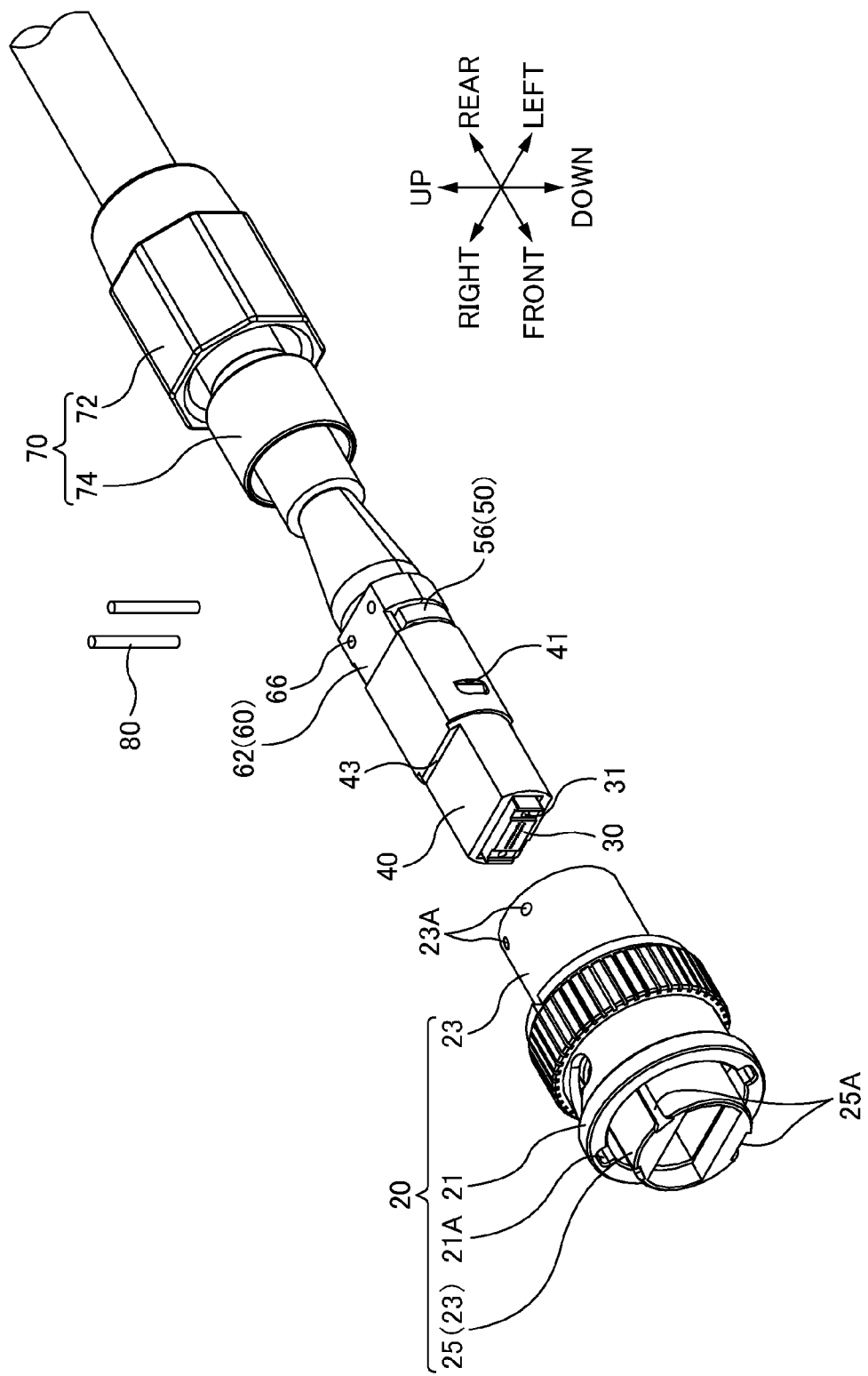
FIG. 3 is an exploded view of the plug-side optical connector 10.
Figure 4:
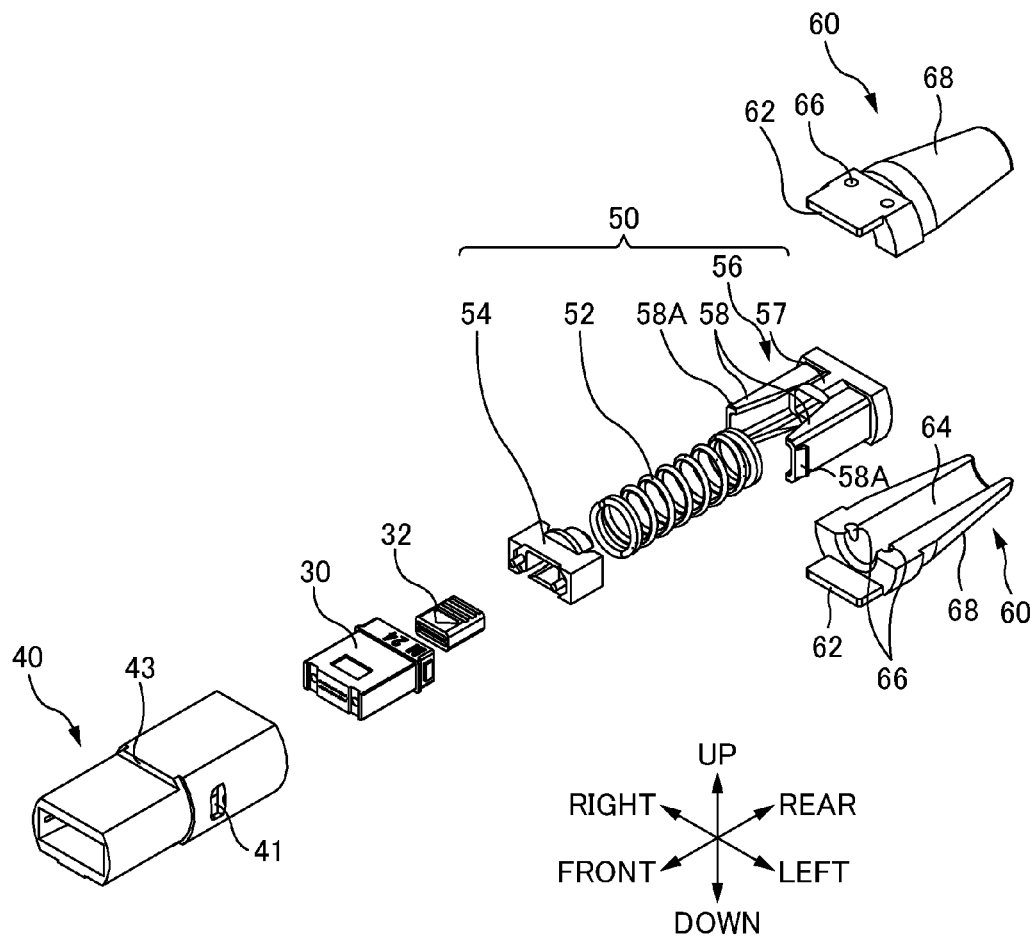
FIG. 4 is an exploded view of a floating mechanism 50 and a metal half member 60.

FIG. 3 is an exploded view of the plug-side optical connector 10. FIG. 4 is an exploded view of the floating mechanism 50 and a metal half member 60.

The plug-side optical connector 10 includes, in addition to the coupling device 20, the ferrule 30 and the housing 40, the floating mechanism 50 and the metal half member 60 (see FIG. 4). The plug-side optical connector 10 also includes a fastening device 70 on the rear side with respect to the floating mechanism 50 and the metal half member 60 (see FIG. 3). A boot 32, which protects optical fibers, is placed in the rear side of the ferrule 30 (see FIG. 4).

Floating Mechanism 50

The housing 40 accommodates the ferrule 30, which can move rearward with the floating mechanism 50. That is, the floating mechanism 50 is a mechanism with which the ferrule 30 is accommodated in the housing in such a manner that the ferrule can move rearward. The floating mechanism 50 includes: a coil spring 52; a catch 54; and an engaging member 56 (a spring push).

The coil spring 52 is placed being compressed between the catch 54 and the engaging member 56. By the reaction force of the compressed coil spring 52, the ferrule 30 is pushed forward through the catch 54. Through the central hollow of the coil spring 52, optical fibers (not shown) are passed.

The catch 54 is a member which affixes the end of the coil spring 52 to the ferrule 30. The front pins of the catch 54 are inserted in the rear openings of the guide holes 31 of the ferrule 30, and the catch 54 is thereby affixed to the ferrule 30. And, the front end of the coil spring 52 is inserted in the spring-fixing section which protrudes backwards of the catch 54, and the front end of the coil spring 52 is thereby affixed to the catch 54. Through the hole of the catch 54 penetrating in the front-rear direction, the optical fibers (not shown) are passed.

The engaging member 56 is a member which causes the coil spring 52 which remains compressed to be accommodated in the housing 40. The engaging member 56 is a U-shaped member including: a receiving section 57; and a pair of arm sections 58 which extends forward from both left and right sides of the receiving section 57 respectively. And, the rear end of the coil spring 52 is in contact with the receiving section 57. Through the hole of the receiving section 57 penetrating in the front-rear direction, optical fibers (not shown) are passed. In a space between the pair of arm sections 58, the coil spring 52 is accommodated. On the front end of each arm section 58, a claw section 58A is formed extending outwardly. The claw sections 58A are respectively hooked to window sections 41 on the sides of the housing 40, and the engaging member 56 engages the housing 40 under the reaction force of the coil spring 52.

Metal Half Member 60

The housing 40 is fixed to the inside of the coupling device 20 (the outer housing 23) while being sandwiched in the front-rear direction between the coupling device 20 (the outer housing 23) and the metal half member 60. And, the metal half member 60 is affixed to the coupling device 20 with metal pins 80. In other words, the metal half member 60 is a metal member which is affixed to the coupling device 20 while holding the housing 40 between itself and the coupling device 20.

The metal half members 60 are respectively the upper and lower metal members each of which is one of a two-part division. Each metal half member 60 includes: a housing holder 62; an optical-fiber passing section 64; two pin holes 66; and a tapered section 68.

The housing holder 62 is a portion which holds the housing between itself and the coupling device. The housing holder 62 is a plate-like portion which protrudes forward, and its front-end face is in contact with the rear-end face 44 of the housing through the engaging member 56. Between two of the plate-like housing holders 62, the receiving section 57 of the engaging member 56 is placed. The upper and lower housing holders 62 are restrained by the upper and lower surfaces of the housing accommodating section 24 of the outer housing 23 of the coupling device 20 (see FIG. 7), with the receiving section 57 of the engaging member 56 being sandwiched in the up-down direction between the housing holders 62.

The optical-fiber passing section 64, in which optical fibers (not shown) are placed, is a groove-like portion formed in the metal half member 60 along the front-rear direction. By mating the two metal half members 60, the optical-fiber passing sections 64 function as a through hole through which the optical fibers pass. The optical fibers are brought out of the optical cable, and then the optical fibers are placed in the optical-fiber passing sections 64 of the mated metal half members 60.

Each pin hole 66 is a hole into which the metal pin 80 are inserted. Two pin holes 23A which extend through in the up-down direction are formed on the rear side of the outer housing 23 of the coupling device 20. Through the pin holes 23A of the outer housing 23 and the pin holes 66 of the metal half members 60, each metal pin 80 is inserted while both ends of the metal pin 80 are placed at the pin holes 23A of the outer housing 23. In this way, the metal half members 60 are affixed to the coupling device 20 through the metal pin 80. Note that, the pin holes 66 of the metal half member 60 penetrate in the up-down direction, and one metal pin 80 is inserted into the pin holes 66 of two upper and lower metal half members 60 so as to penetrate them. In this way, the two metal half members 60 are affixed through the metal pins 80. The outside of the pin holes 23A of the outer housing 23 is covered with an outer fastening device 72 (see FIG. 3), and the metal pins 80 do not be removed from the pin holes 23A of the outer housing 23 and the pin holes 66 of the metal half members 60.

The metal pins 80 are arranged parallel in the up-down direction, which is perpendicular to the front-rear direction (direction of attaching/detaching). In other words, the metal half members 60 and the outer housing 23 of the coupling device 20 are fixed by the metal pins 80, which are arranged parallel in the up-down direction. When attaching/detaching the optical connector, force in the front-rear direction (direction of attaching/detaching) is applied to portions to which the metal half members 60 and the outer housing 23 of the coupling device 20 are affixed. The metal pins 80 are therefore arranged perpendicular to a force in the direction of attaching/detaching, and durability is thereby improved.

The tapered section 68 is a section including a tapered surface, the shape of which becomes narrower towards the rear. The tapered section 68 is a section on the rear side of the metal half member 60, and is located inside the fastening device 70. The jacket of an optical cable is split when bringing out optical fibers from the optical cable, and then the split jacket is placed covering the outside of the tapered section 68 of the metal half member 60 (see FIG. 8D).

Fastening Device 70

The fastening device 70 is a device which affixes the optical connector 10 to an end of an optical cable. The fastening device 70 includes: the outer fastening device 72; and an inner fastening device 74 (see FIG. 3).

In the outer fastening device 72, female screws are formed. And, male screws are formed on the outer surface of the rear end section of the outer housing 23 of the coupling device 20 (not shown in FIG. 3 for omitting screw threads), these male screws mate with the female screws of the outer fastening device 72.

The inner fastening device 74 is a cylindrical metal member inside the outer fastening device 72. When the outer fastening device 72 is fastened, the inner fastening device 74 moves forward together with the outer fastening device 72. The outer fastening device 72 and the coupling device 20 are joined by screwing, the jacket of the optical cable is maintained to be sandwiched between the tapered section 68 of the metal half member 60 and the inner surface of the inner fastening device 74. The rear part of the optical connector 10 is thereby fixed to an end of the optical cable.

As mentioned above, the coupling device 20 (the outer housing 23) is affixed by the fastening device 70 and the metal half member 60. That is, the coupling device 20 (the outer housing 23) is affixed by metal parts. Thus, even if the coupling device 20 is subject to force when attaching/detaching the optical connector 10, the force can be supported by the metal parts and high durability can be realized.

Housing 40

Figure 5A:
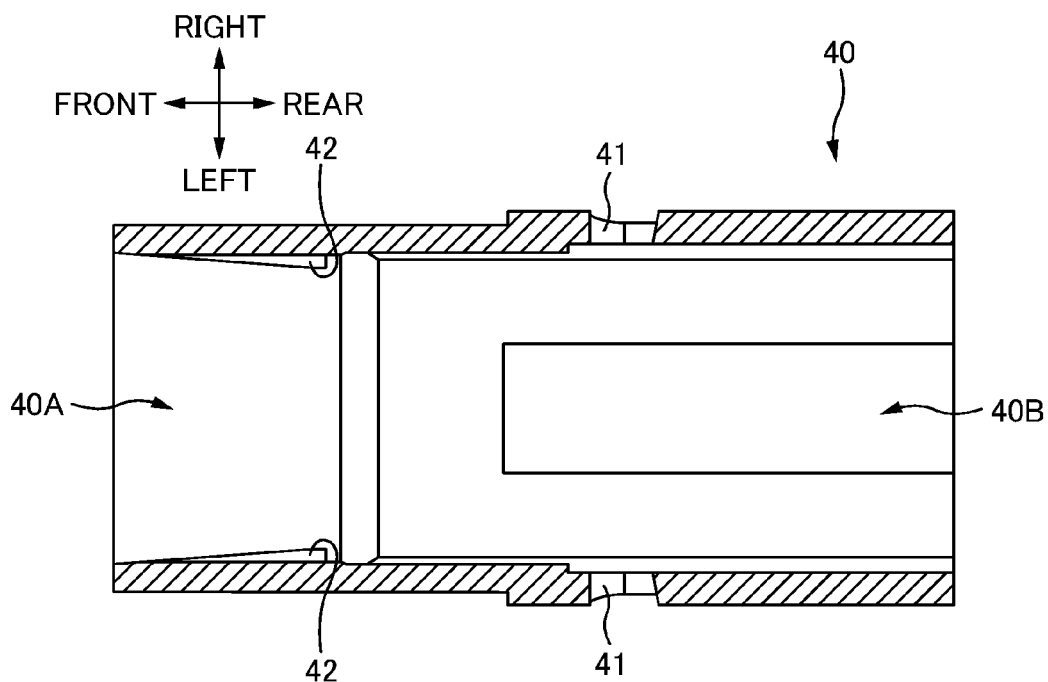
FIGS. 5A and 5B are cross-sectional views of a housing 40.
Figure 5B:
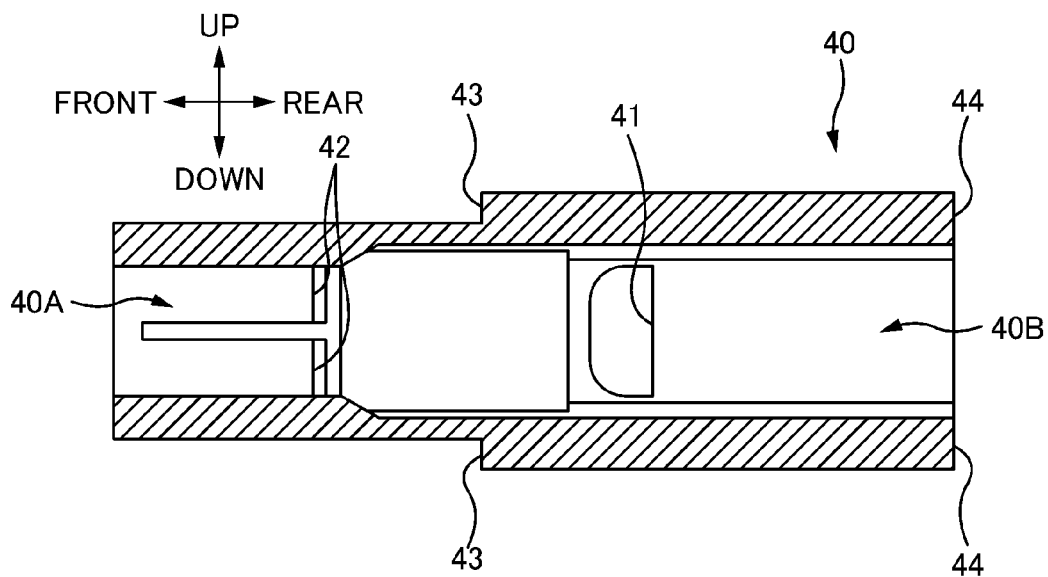
Figure 6A:
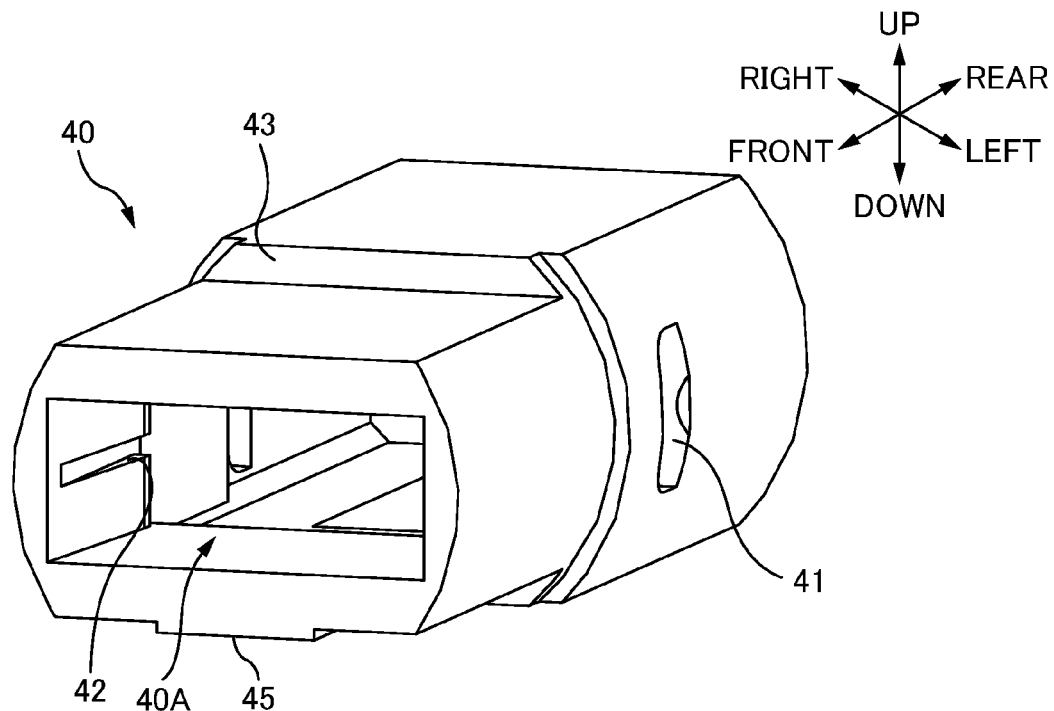
FIGS. 6A and 6B are perspective views of the housing 40.
Figure 6B:
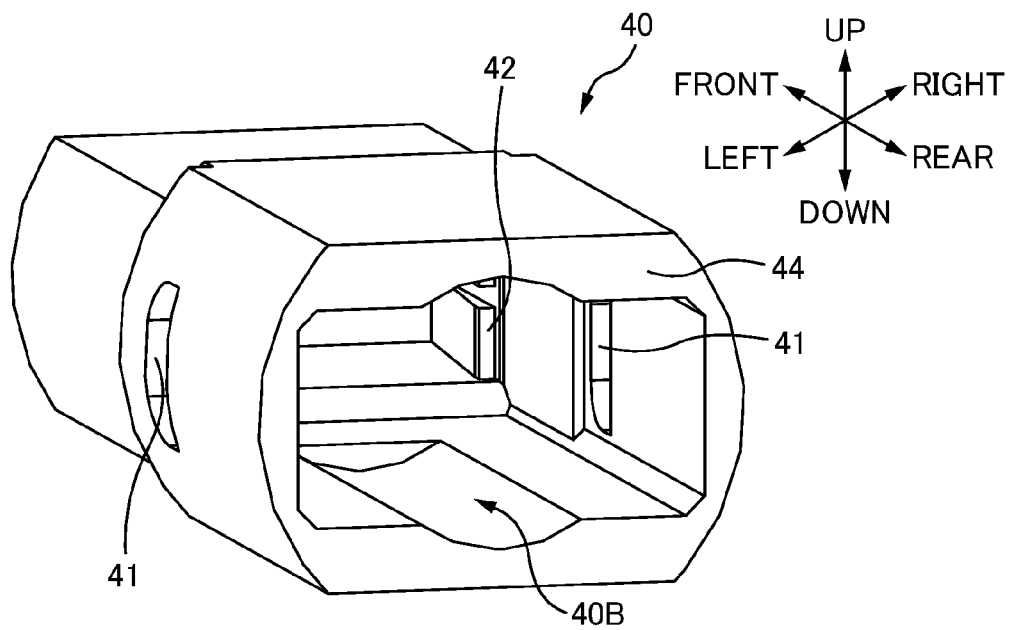

FIGS. 5A and 5B are cross-sectional views of the housing 40. FIGS. 6A and 6B are perspective views of the housing 40.

The housing 40 is a member (an inner housing) which accommodates the ferrule 30 in such a manner that the ferrule can move rearward and which is accommodated by the coupling device 20 (the outer housing 23). Inside the housing 40, a ferrule accommodating section 40A and a spring accommodating section 40B are formed.

The ferrule accommodating section 40A is an accommodating section (accommodating space) which accommodates the ferrule 30, and is formed in the front side of the housing 40. The front part of the ferrule accommodating section 40A has an opening, and the end face of the ferrule 30 protrudes from the opening. On the side walls of the ferrule accommodating section 40A, protrusions 42 are formed, and the ferrule 30 is pushed forward by the reaction force of the coil spring 52 of the floating mechanism 50 while the flange of the ferrule 30 engaging the foregoing protrusions 42.

The spring accommodating section 40B is an accommodating section (accommodating space) which accommodates the floating mechanism 50, which includes the coil spring 52, the catch 54 and the engaging member 56. And, the spring accommodating section 40B is formed in the rear side of the housing 40. The rear part of the ferrule accommodating section 40A has an opening, and the receiving section 57 of the engaging member 56 protrudes from the opening. The window sections 41 are formed on the side walls of the spring accommodating section 40B, and the claw sections 58A of the arm sections 58 of the engaging member 56 are respectively hooked to the window section 41.

Figure 7:
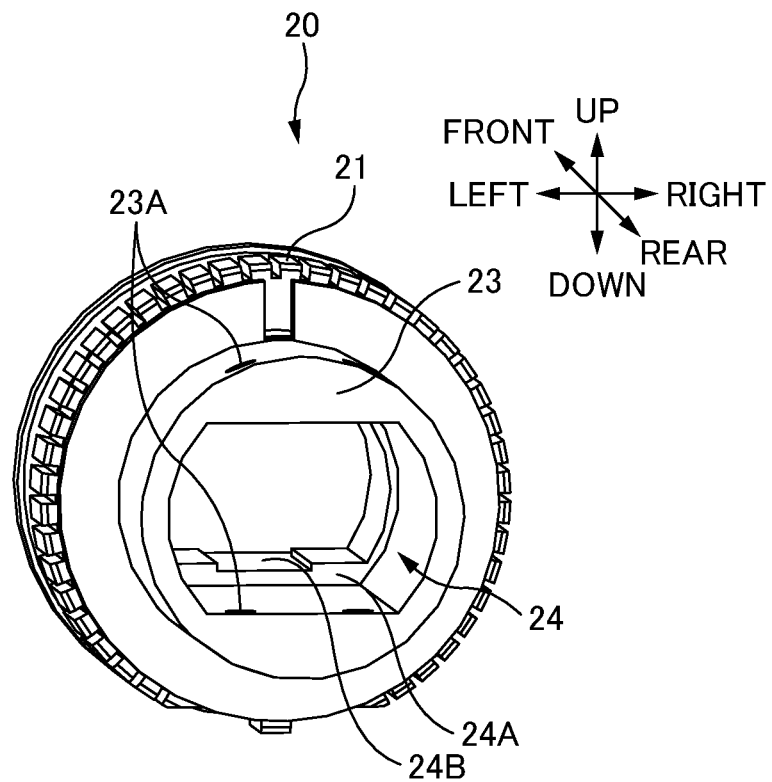
FIG. 7 is a perspective view showing a housing accommodating section 24 of an outer housing 23 of a coupling device 20.

Contact surfaces 43 are formed outside of the housing 40. The contact surfaces 43 are each a surface which faces forward (a surface whose normal vector extends forward). As shown in FIG. 7, in the housing accommodating section 24 of the outer housing 23 of the coupling device 20, an alignment surface 24A protruding from inner walls are formed. The alignment surface 24A faces rearward. This alignment surface 24A is in contact with the contact surfaces 43 of the housing 40, the front part of the housing 40 is thereby positioned with respect to the outer housing 23. The rear-end face 44 of the housing 40 is in contact with the front-end face of the housing holder 62 of the metal half member 60. Since the metal half member 60 is affixed to the coupling device 20, the housing 40 is fixed to the inside of the outer housing 23 of the coupling device 20 while being sandwiched in the front-rear direction between the alignment surface 24A of the outer housing 23 and the housing holder 62 of the metal half member 60. Since the contact surface 43 is in contact with the alignment surface 24A, the contact surface 43 will not collide with the alignment surface 24A even if the optical connector is repeatedly attached/detached. Thus, the contact surface 43 of the housing 40 made of resin is less likely to wear.

An alignment key 45 is formed on the lower surface in the front side of the housing 40 (in the front side with respect to the contact surface 43). As shown in FIG. 7, a keyway 24B is formed on the inner surface of the housing accommodating section 24 of the outer housing 23 of the coupling device 20. By mating the keyway 24B with the alignment key 45 of the housing 40, the housing 40 and the coupling device 20 are aligned to each other.

The housing 40 is made of resin. Specifically, the housing 40 is made of PBT resin (polybutylene terephthalate). The ferrule 30 is also made of resin. Specifically, the ferrule 30 is made of PPS resin (polyphenylene sulfide). The Young's modulus of the ferrule 30 is therefore closer to the Young's modulus of the housing 40 than to the Young's modulus of the coupling device 20 made of metal (SUS: stainless steel). Specifically, the Young's modulus of the ferrule 30 is 3.96 kN/mm$^2$, the Young's modulus of the housing 40 is 2.4 kN/mm$^2$, and the Young's modulus of the coupling device 20 is 193 kN/mm$^2$.

Here, suppose that the housing 40 is a metal housing and that the ferrule 30 is accommodated by the metal housing in such a manner that the ferrule can move rearward. In this case, a portion of the ferrule 30 which is in contact with the metal housing (e.g., flange) is subject to force directly from the metal housing when attaching/detaching the optical connector 10, and the difference in Young's modulus between the metal housing and the ferrule is large. Consequently, the ferrule 30 is likely to wear, the durability of the optical connector deteriorates (the allowable number of attaching/detaching of the optical connector decreases).

As opposed thereto, in the present embodiment, since the housing 40 is made of resin, the difference between the Young's modulus of the housing 40 and the Young's modulus of the ferrule 30 is smaller than the difference between the Young's modulus of the coupling device 20 (the outer housing 23) and the Young's modulus of the ferrule 30. This makes it possible to reduce load which the flange of the ferrule 30 is subject to, which is in contact with the housing 40. And, this also makes it possible to improve the durability of the optical connector.

Method for Assembling Optical Connector 10

FIGS. 8A to 8E are explanatory diagrams showing a method for assembling the plug-side optical connector 10.

Figure 8A:
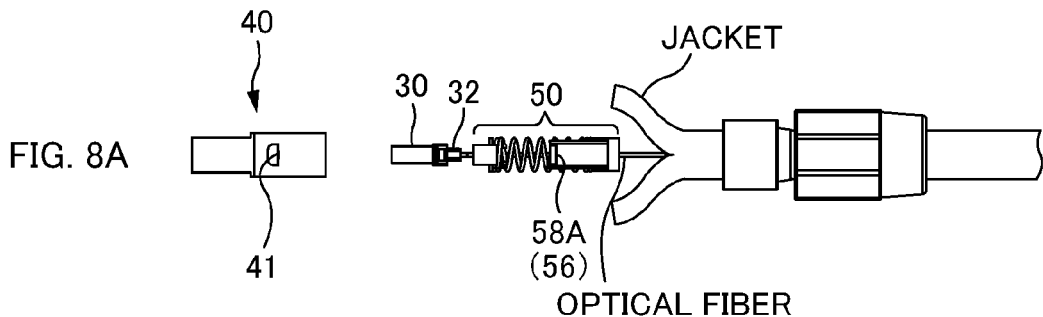
FIGS. 8A to 8E are explanatory diagrams showing a method for assembling the plug-side optical connector 10.

First, an operator passes in advance an optical cable through the fastening device 70 (the outer fastening device 72 and the inner fastening device 74), and then optical fibers are brought out of the optical cable. At this stage, the operator splits the jacket of the optical cable, and bring out the optical fibers of the optical cable. As shown in FIG. 8A, the operator passes in advance the optical fibers through the floating mechanism 50 and the boot 32, and then attaches the ferrule 30 (and the boot 32) to the ends of the optical fibers. And, the operator fixes the ends of the optical fibers to the ferrule 30 with adhesion.

Next, as shown in FIG. 8A, the operator inserts the ferrule 30 and the floating mechanism 50 from the rear side of the housing 40. If the claw section 58A of the engaging member 56 of the floating mechanism 50 is hooked to the window section 41 of the housing 40, the ferrule 30 is accommodated inside the housing 40 in such a manner that the ferrule can move rearward with the floating mechanism 50.

Figure 8B:
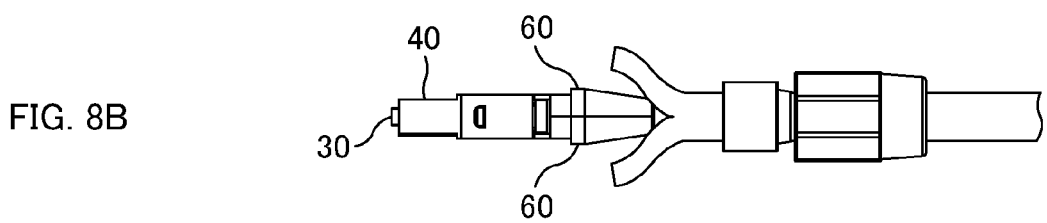

Next, as shown in FIG. 8B, the operator attaches the metal half members 60 from above and below. Since the metal half members 60 are respectively upper and lower members of a two-part division, an optical cable and optical fibers do not have to passes in advance through the metal half members 60. Thus, the metal half members 60 are easy to attach. The operator places the metal half members 60 so that the front-end face of the housing holder 62 of the metal half member 60 is in contact with the rear-end face 44 of the housing 40 through the receiving section 57 of the engaging member 56. Also, the operator places the split jacket of the optical cable so that the jacket covers the outside of the tapered section 68 of the metal half member 60. Also, the operator cuts a fiber member such as Kevlar of the optical cable to a comparable length to the jacket, and places the fiber member so that the fiber member covers the outside of the tapered section 68 of the metal half member 60.

Figure 8C:
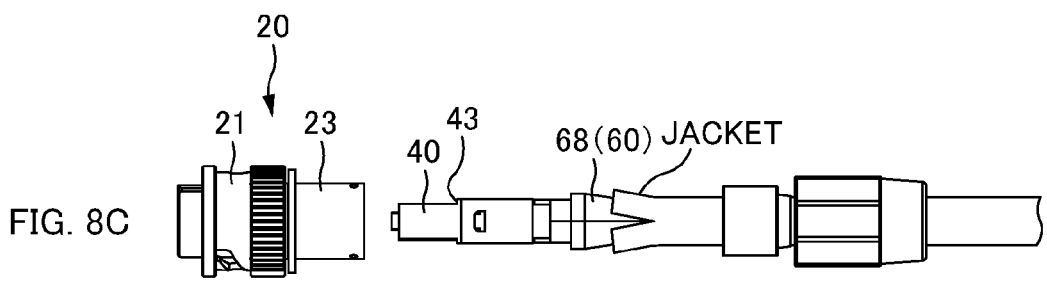

Next, as shown in FIG. 8C, the operator insert the housing 40 and the like from the rear side the coupling device. Then, while mating the alignment key 45 of the housing 40 with the keyway 24B of the housing accommodating section 24 the outer housing 23 of the coupling device 20, the operator inserts the housing 40 and the like from the rear side of the outer housing 23. The housing 40 and the coupling device 20 are thereby aligned to each other. Also, the operator inserts the housing holders 62 of the upper and lower metal half members 60 into the spring accommodating section 40B in the outer housing 23 of the coupling device 20 (see FIG. 7) while sandwiching the receiving section 57 of the engaging member 56 between these two housing holders 62 in the up-down direction. Then, since the housing holders 62 of the metal half members 60 are guided by the upper and lower surfaces of the spring accommodating section 40B, the housing 40 and the like become less likely to shift with respect to the outer housing 23 in the direction of rotation (in the direction of rotation about the front-rear direction).

When inserting the housing 40 into the outer housing 23, the contact surface 43 of the housing 40 comes into contact with the alignment surface 24A of the housing accommodating section 24 of the outer housing 23 (see FIG. 7), and then the housing 40 is positioned with respect to the outer housing 23. Then, the upper and lower housing holders 62 are restrained by the upper and lower surfaces of the spring accommodating section 40B (see FIG. 7), and therefore the metal half member 60 becomes less likely to be misaligned. Also, the pin hole 23A of the outer housing 23 and the pinhole 66 of the metal half member 60 are aligned in the up-down direction.

Figure 8D:
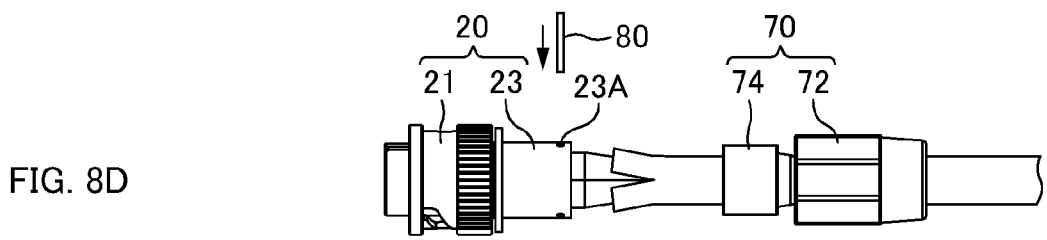

Next, as shown in FIG. 8D, the operator inserts metal pins 80 into the pin holes 23A of the outer housing 23 of the coupling device 20 and the pin holes 66 of the metal half member 60. The coupling device 20 and the metal half member 60 are therefore affixed with the metal pins 80. And, the housing 40 is fixed to the inside of the coupling device while being sandwiched in the front-rear direction between the housing holder 62 of the metal half member 60 and the alignment surface 24A of the housing accommodating section 24 of the outer housing 23 of the coupling device 20.

Figure 8E:
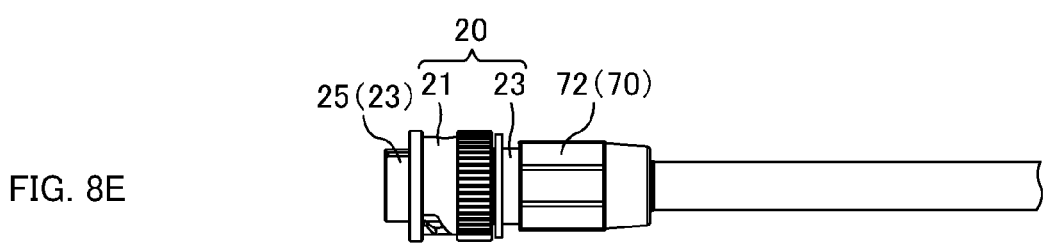

Finally, as shown in FIG. 8E, the operator fastens the outer fastening device 72, and thereby the male screws on the outer surface of the rear end section of the coupling device 20 (not shown in FIG. 3 for omitting screw threads) mate with the female screws of the outer fastening device 72. When the outer fastening device 72 is fastened, the inner fastening device 74 moves forward together with the outer fastening device 72. When the inner fastening device 74 moves forward, the jacket of the optical cable (fiber member such as Kevlar) is sandwiched between the tapered section 68 of the metal half member 60 and the inner surface of the inner fastening device 74. The rear part of the optical connector 10 is thereby affixed to an end of the optical cable.

Second Embodiment

Attachment on Receptacle Side

Before the description of an attachment of the present embodiment, a cleaning tool used for cleaning an optical connector to which attachment is to be attached will be described.

Figure 9A:
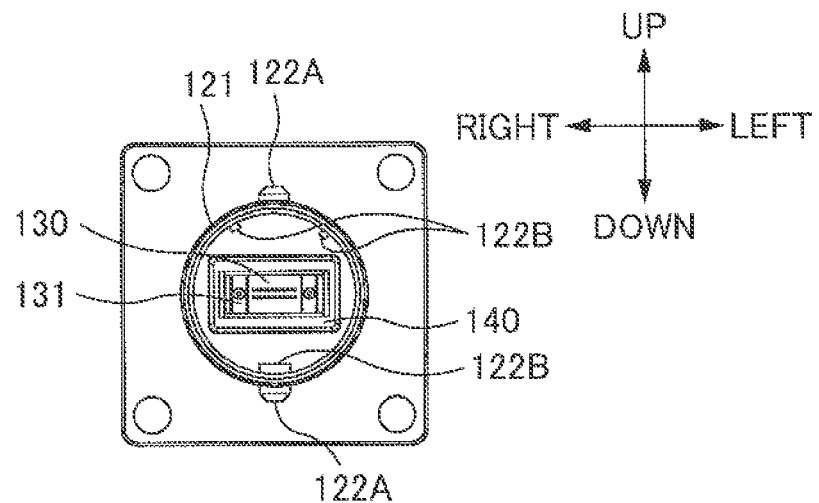
FIGS. 9A and 9B are explanatory diagrams of a receptacle-side optical connector 110.
Figure 9B:
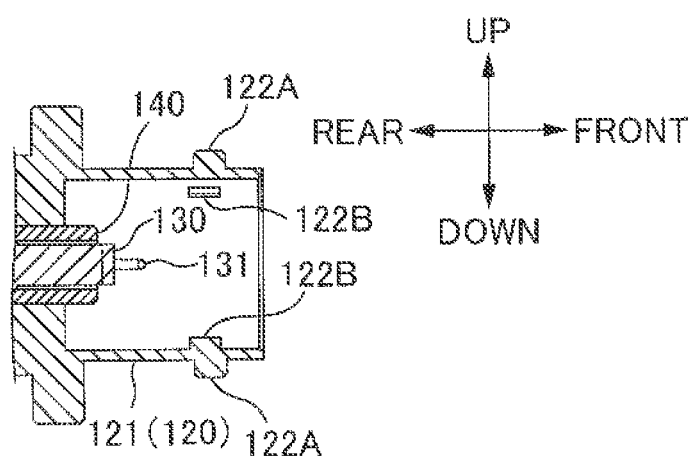

FIGS. 9A and 9B are explanatory diagrams of a receptacle-side optical connector 110 which is to be cleaned. FIG. 9A is its front view, and FIG. 9B is a cross-sectional view of it. The configuration of the optical connector 110 is the same as in the first embodiment.

Outline of Cleaning Tool 1

Figure 10:
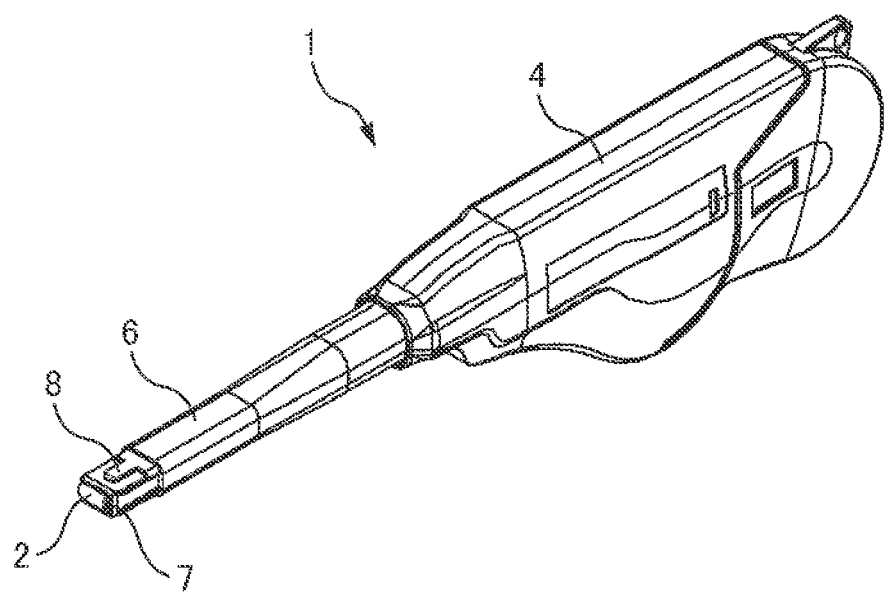
FIG. 10 is a perspective view of an optical-connector cleaning tool 1.

FIG. 10 is a perspective view of an optical-connector cleaning tool 1 (hereinafter also merely referred to as a "cleaning tool 1"). The cleaning tool 1 includes: a tool body 4; and a extending section 6 which extends from an opening of the tool body 4.

The cleaning tool 1 is usually used for cleaning an MPO connector (the MPO connector is different in shape from the optical connectors 10 and 110 of the first embodiment). The MPO connector is an optical connector in which MT type optical connector (JIS C5981) is used as an optical connector ferrule, and is capable of coupling by an optical adapter in a removable manner.

The extending section 6 includes a head 7. The head 7 is a member for pushing a cleaning unit 2 against the connecting end face of the MPO connector (the end face of a ferrule). The head 7 is located at an end of the extending section 6, and the cleaning unit 2 is exposed outside so that the cleaning unit 2 is pushed against the MPO connector.

On the extending section 6, a protuberance 8 is formed. The protuberance 8 has a shape which mates with the keyway of the optical adapter of the MPO connector. When cleaning with the cleaning tool 1 the MPO connector in the optical adapter, the head 7 of the extending section 6 is inserted to the optical adapter while mating the protuberance 8 with the keyway of the optical adapter.

The shape of the tip end of the extending section 6 of the cleaning tool 1 is suitable for cleaning the MPO connector. And, if the operator inserts the head 7 of the extending section 6 to the optical adapter while mating the protuberance 8 with the keyway of the optical adapter, the extending section 6 of the cleaning tool 1 is guided by the inner wall surface of the optical adapter. Thus, the cleaning unit 2 of the head 7 spontaneously reaches to the connecting end face of the MPO connector (the end face of a ferrule).

Figure 11A:
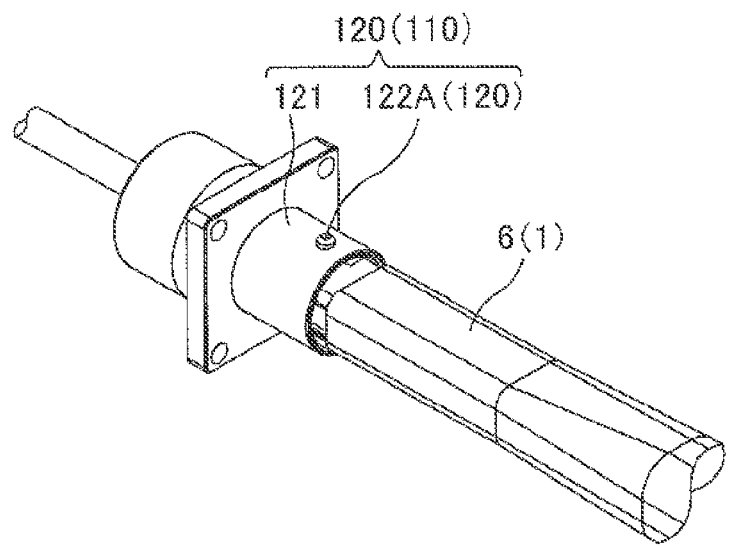
FIG. 11A is an explanatory diagram showing clean operation of the reference example.

On the other hand, the receptacle-side optical connector 110 (or the plug-side optical connector 10) shown in FIG. 1A is different in shape from the MPO connector (and optical adapter). And, as shown in FIG. 11A, a space therefore exists in the surrounding area of the extending section 6 even if the tip end of the extending section 6 is inserted into the receptacle-side optical connector 110. This causes misalignment of the cleaning unit 2 of the head 7 with respect to the ferrule 130, and it is consequently possible that the cleaning tool cannot conduct normal cleaning work.

Figure 11B:
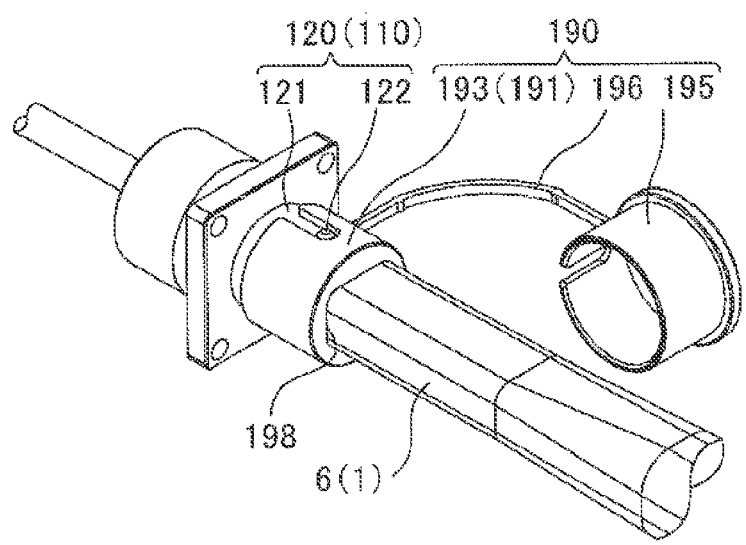
FIG. 11B is an explanatory diagram showing clean operation of the second embodiment.

In the present embodiment, as shown in FIG. 11B, an attachment 190 is attached to the receptacle-side optical connector 110, and the tip end of the extending section 6 of the cleaning tool 1 is inserted into the guiding hole 198 of the attachment 190. This enables the extending section 6 of the cleaning tool 1 to be guided by the inner wall surface of the attachment 190, and it is therefore possible to prevent misalignment between the cleaning unit 2 of the head 7 and the end face of the ferrule 130 of the optical connector 110.

Attachment 190

Figure 12A:
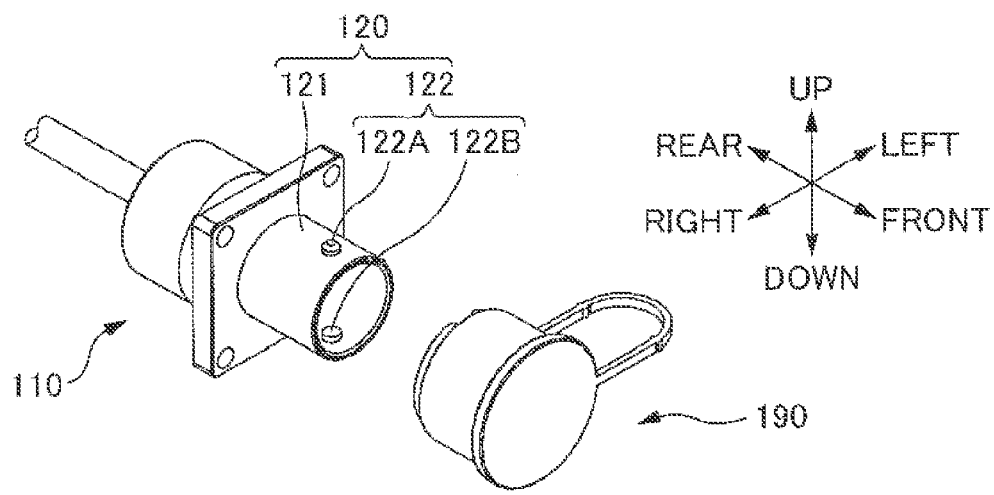
FIGS. 12A to 12C are explanatory diagrams showing the use of a receptacle-side attachment 190.
Figure 12B:
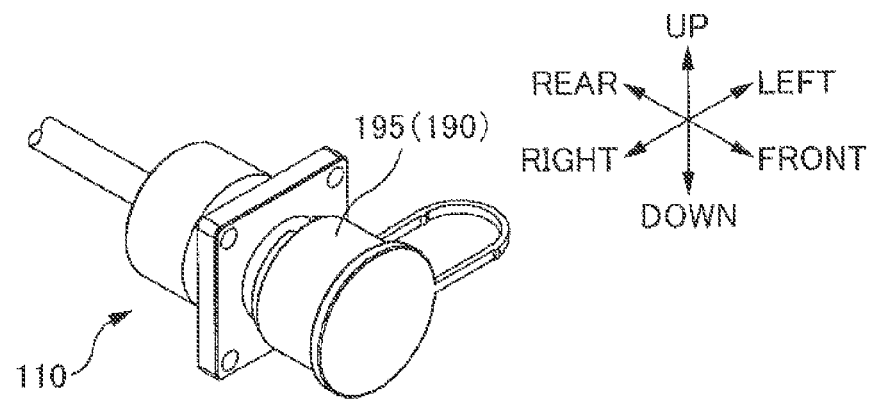
Figure 12C:
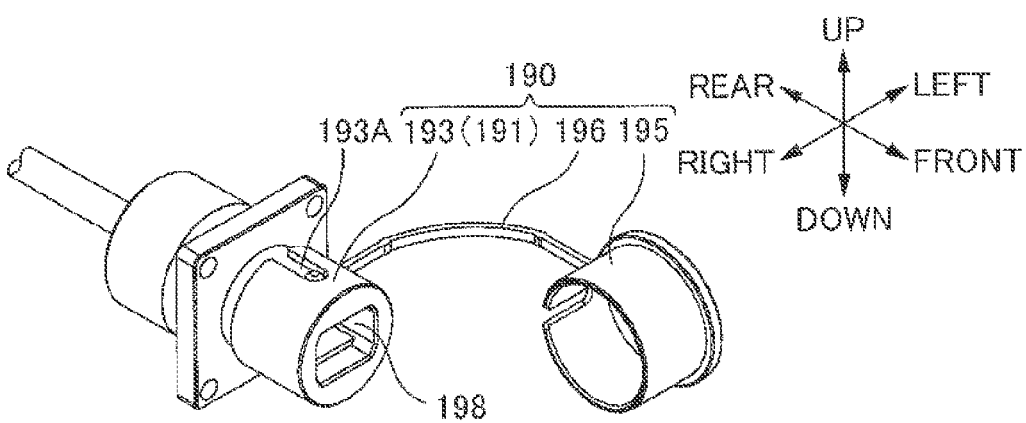
Figure 13A:
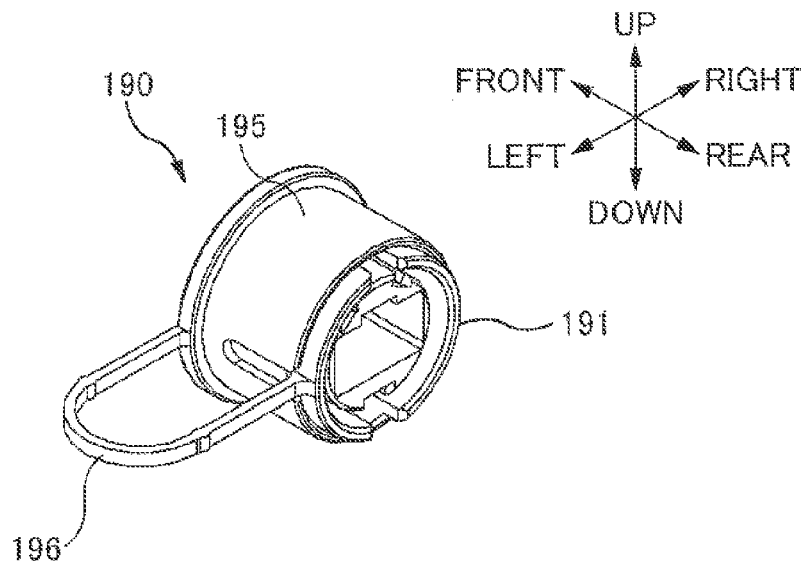
FIGS. 13A and 13B are perspective views of the receptacle-side attachment 190 as viewed from the rear.
Figure 13B:
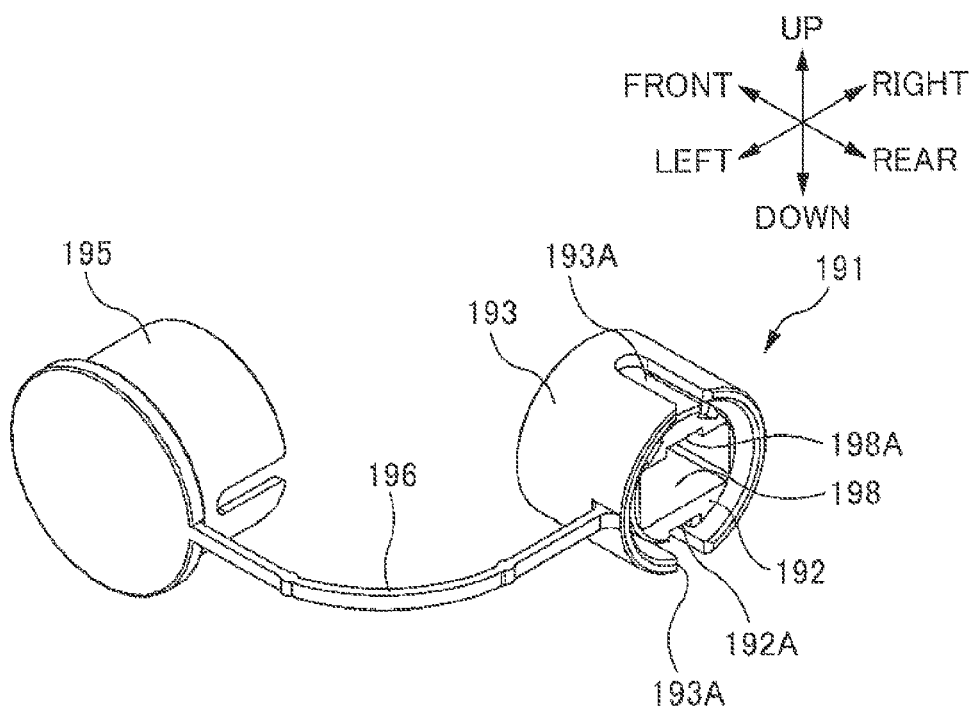

FIG. 12A to 12C are explanatory diagrams showing the use of the receptacle-side attachment 190. FIGS. 13A and 13B are perspective views of the receptacle-side attachment 190 as viewed from the rear. Directions in the following description of the attachment 190 are in accordance with the foregoing definitions of the directions in the optical connector 110 which is to be couple with the optical connector 10.

The attachment 190 includes: an attachment main body 191; a cap 195; and a linking section 196. The attachment main body 191 includes a guiding hole 198 that guides the extending section 6 of the cleaning tool 1, and is a portion which is fitted to the coupling device 120 of the optical connector 110. The cap 195 is a cover of the guiding hole 198 of the attachment main body 191. The linking section 196 links the attachment main body 191 and the cap 195. The attachment 190 is formed as a single unit and is made of resin, and the attachment main body 191 is formed as a single piece with the cap 195 and the linking section 196.

As shown in FIGS. 12A and 12B, the attachment 190 can be attached to and detached from the front side of the receptacle-side optical connector 110. As shown in FIG. 12C, the cap 195 can be removed with the attachment main body 191 remaining attached to the optical connector 110. Since the cap 195 is linked to the attachment main body 191 by the linking section 196, the loss of the removed cap 195 can be avoided. If the cap 195 is removed, the cleaning tool 1 can be inserted to the attachment main body 191 (see FIG. 11B). As shown in FIG. 12B, if the guiding hole 198 is covered with the cap 195, dust, oil and the like from the guiding hole 198 can be blocked and contamination of the ferrule 130 can be prevented.

Figure 14:
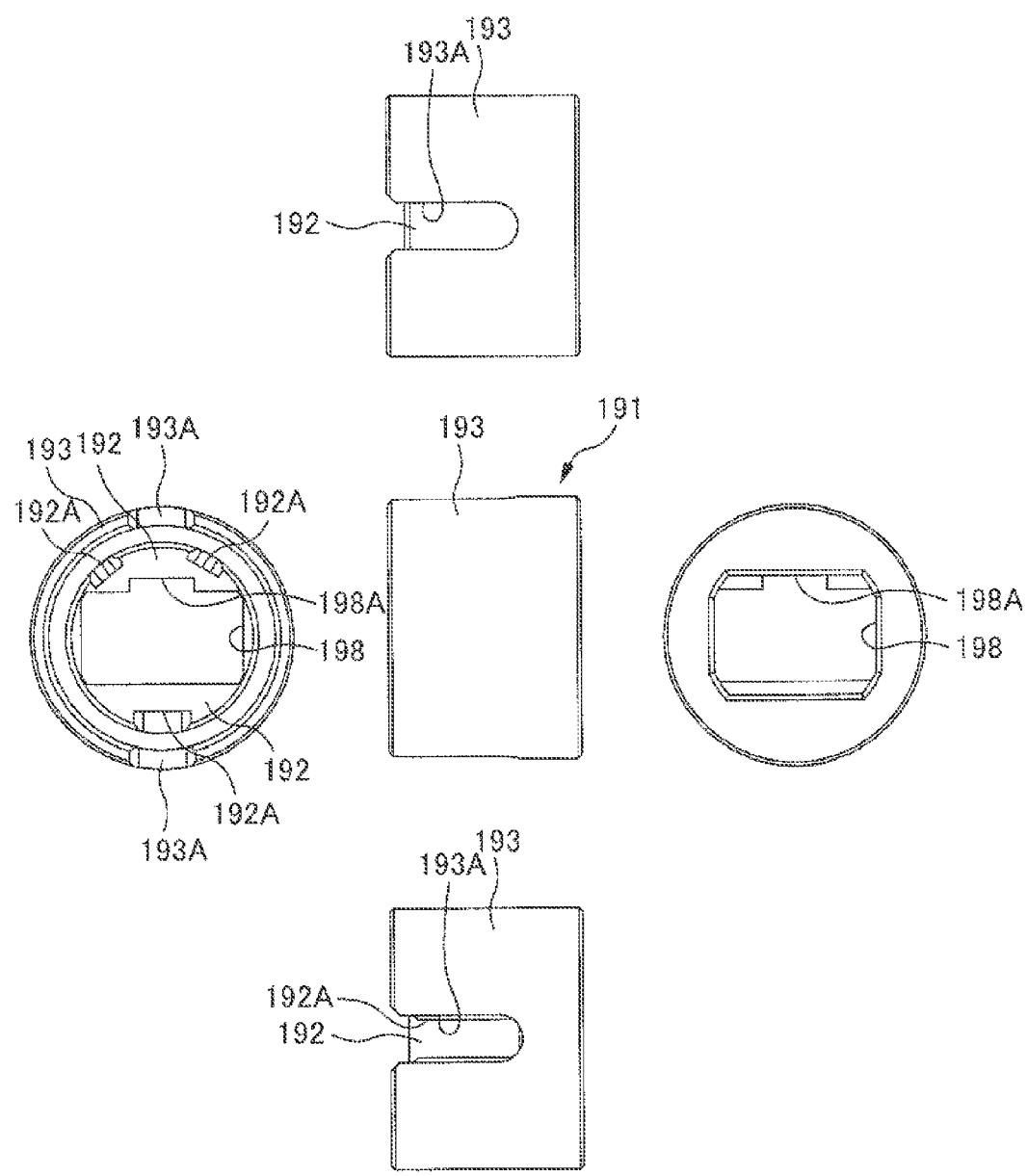
FIG. 14 is an explanatory diagram (orthogonal projection) of the shape of an attachment main body 191.
Figure 15:
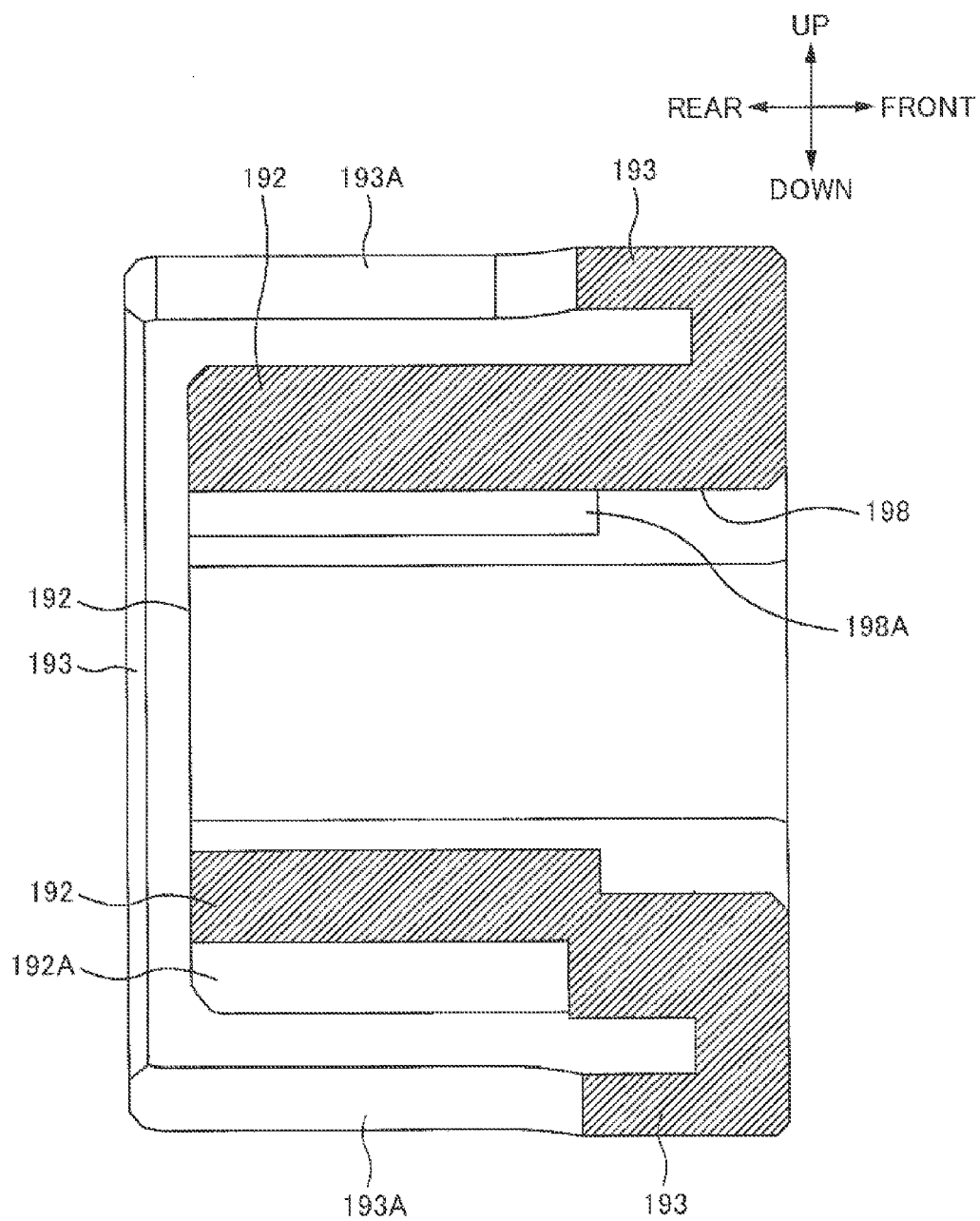
FIG. 15 is a cross-sectional view of the attachment main body 191.

FIG. 14 is an explanatory diagram (orthogonal projection) of the shape of the attachment main body 191. FIG. 15 is a cross-sectional view of the attachment main body 191. For illustrating the shape of the attachment main body 191, the cap 195 and the linking section 196 are omitted in the figure.

The attachment main body 191 includes: an inner fitted section 192; and an outer fitted section 193.

The inner fitted section 192 is a cylindrical portion which is inserted (fitted) to the main body 121 of the coupling device 120 of the optical connector 110. In the inner fitted section 192, an guiding hole 198 is formed. On the outer surface of the inner fitted section 192, a groove 192A whose position matches the position of the inner projection 122B of the coupling device 120 of the optical connector 110 is formed along the front-rear direction. In other words, the shape of the inner fitted section 192 is substantially the same as that of the inserted section 25 of the plug-side optical connector 10.

The receptacle-side optical connector 110 is a female connector (the main body 121 of the coupling device 120 of the optical connector 110 has a female form), and the cylindrical main body 121 of the coupling device 120 has a large inside diameter. The inner fitted section 192 having the guiding hole 198 can therefore be inserted into the cylindrical main body 121 of the coupling device 120. This can prevent the protruding of the attachment main body 191 from the end of the optical connector 110 (the protruding from the front side of the optical connector 110) when the attachment main body 191 is attached to the optical connector 110.

The outer fitted section 193 is a portion which is fitted outside the main body 121 of the coupling device 120 of the optical connector 110, and has a cylindrical shape which surrounds the inner fitted section 192 from the outside. The main body 121 of cylindrical coupling device 120 is fitted to an annular space between the inner surface of the outer fitted section 193 and the outer surface of the inner fitted section 192. That is, the inner fitted section 192 is fitted inside the main body 121 of cylindrical coupling device 120, and the outer fitted section 193 is fitted outside the main body 121 of the cylindrical coupling device 120. In the outer fitted section 193, a groove 93A (notch) is formed along the front-rear direction, the groove 93A mating with the outer projection 122A of the coupling device 120 of the optical connector 110. The outer fitted section 193 is made of resin and is formed as a single piece with the inner fitted section 192. And, the outer fitted section 193 is linked to the inner fitted section 192 on the front side.

The guiding hole 198 is a hole which guides the tip end of the extending section 6 of the cleaning tool 1. The guiding hole 198 guides the extending section 6 of the cleaning tool 1 towards the front-rear direction, along its inner wall surface. The cross section of the guiding hole 198 is thus suitable in shape for the tip end of the extending section 6 of the cleaning tool 1. When cleaning the ferrule 130 in the optical connector 110 using the cleaning tool 1, the operator inserts the head 7 of the extending section 6 of the cleaning tool 1 into the guiding hole 198 of the attachment main body 191 while mating the extending section 6 of the cleaning tool 1 with the guiding hole 198 of the attachment main body 191. This makes it possible to prevent misalignment between the cleaning unit 2 of the head 7 and the end face of the ferrule 130 of the optical connector 110 (This enables the cleaning unit 2 of the head 7 and the end face of the ferrule 130 of the optical connector 110 to precisely face each other).

On the upper side of the guiding hole 198, a keyway 198A is formed whose position matches the position of the protuberance 8 located in the tip end of the extending section 6 of the cleaning tool 1; the protuberance 8 is for mating the keyway of optical adapter of the MPO connector. When cleaning the ferrule 130 in the optical connector 110 with the cleaning tool 1, the operator inserts the head 7 of the extending section 6 of the cleaning tool 1 into the guiding hole 198 of the attachment main body 191 while mating the protuberance 8 of the cleaning tool 1 with the keyway 198A of the attachment main body 191. The keyway 198A allows the operator to insert the head 7 of the cleaning tool 1 into the attachment main body 191 appropriately in the up-down direction of the cleaning tool 1. This makes it possible to insert the head 7 of the cleaning tool 1 so that the head 7 fits the inclined plane of the end face of the ferrule 130.

With the present embodiment, the attachment 190 is attached not to the cleaning tool 1, but to the optical connector 110. It is therefore not necessary to attach the attachment to the cleaning tool 1. For example, at the time of cleaning many optical connectors, if an attachment is attached to each optical connector, the operator does not have to replace an attachment depending on an optical connector which is to be cleaned. This makes cleaning operations efficient.

Modified Example of Second Embodiment

Figure 16A:
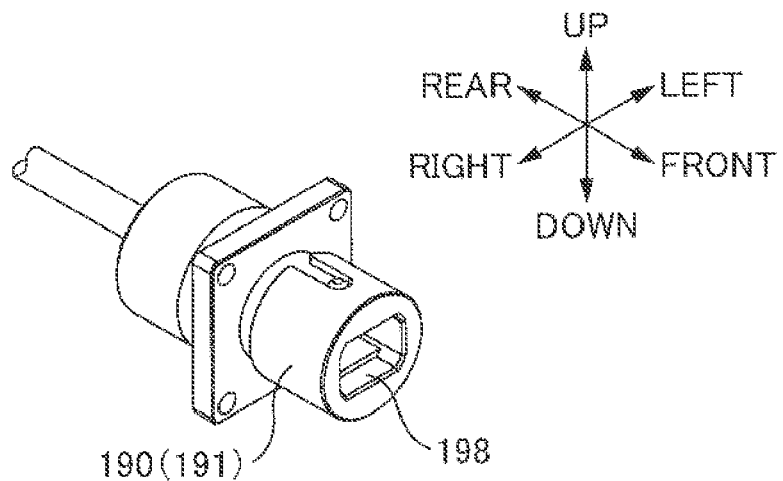
FIG. 16A is an explanatory diagram of the first modified example of the attachment 190 of the second embodiment.

FIG. 16A is an explanatory diagram of the first modified example of the attachment 190 of the second embodiment.

The attachment 190 of the first modified example is composed alone of the foregoing attachment main body 191. In other words, the attachment 190 of the first modified example does not include the cap 195 (and the linking section 196). In the first modified example, since the guiding hole 198 is not covered, the ferrule 130 may be contaminated. But, the head 7 of the extending section 6 of the cleaning tool 1 can be inserted into the guiding hole 198. This makes it possible to prevent misalignment between the cleaning unit 2 of the head 7 and the end face of the ferrule 130 of the optical connector 110.

Figure 16B:
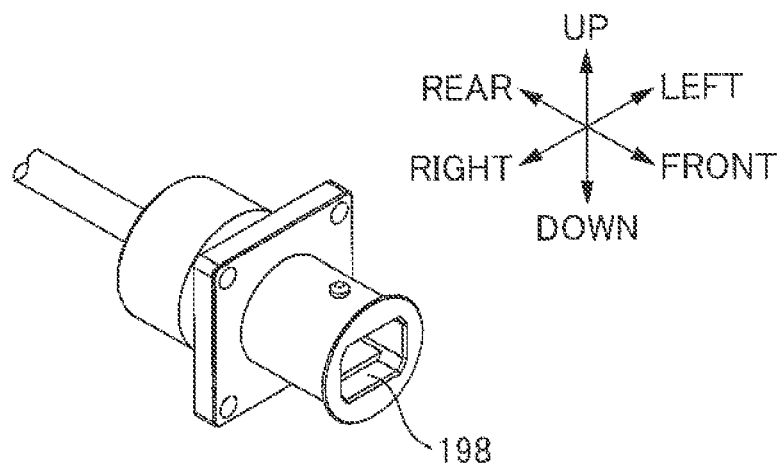
FIG. 16B is an explanatory diagram of the second modified example of the attachment 190 of the second embodiment.

FIG. 16B is an explanatory diagram of the second modified example of the attachment 190 of the second embodiment.

The attachment 190 of the second modified example includes the inner fitted section 192 of the attachment main body 191 mentioned above, but does not include the outer fitted section 193. In the second modified example, since the head 7 of the extending section 6 of the cleaning tool 1 can be inserted into the guiding hole 198, it is possible to prevent misalignment between the cleaning unit 2 of the head 7 and the end face of the ferrule 130 of the optical connector 110.

Third Embodiment

Attachment on Plug Side

Figure 17A:
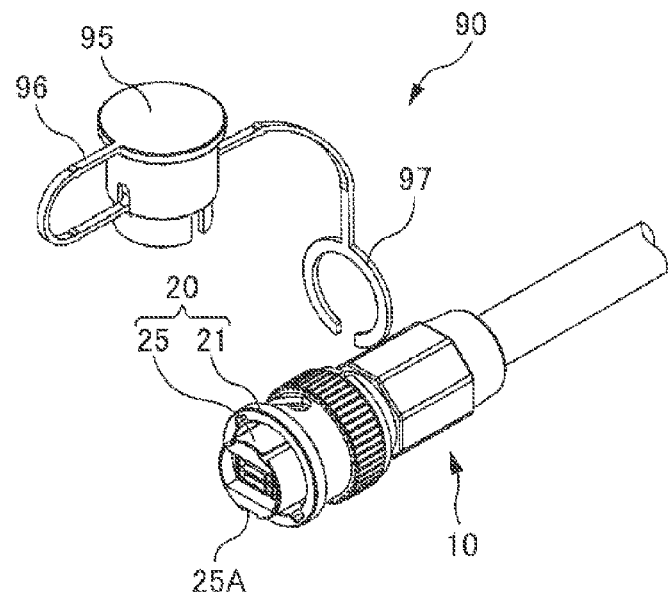
FIGS. 17A to 17C are explanatory diagrams showing the use of a plug-side attachment 90.
Figure 17B:
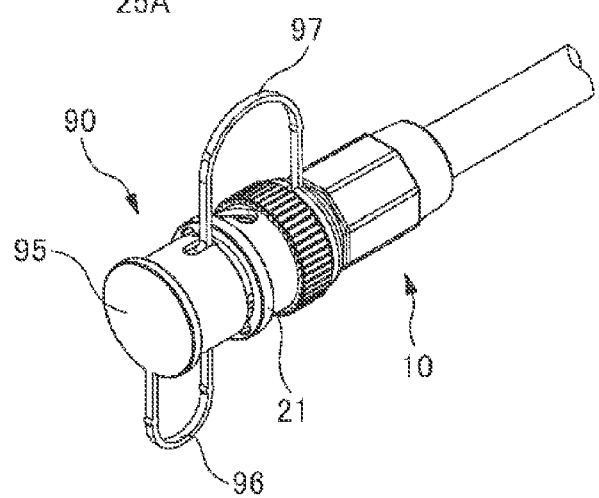
Figure 17C:
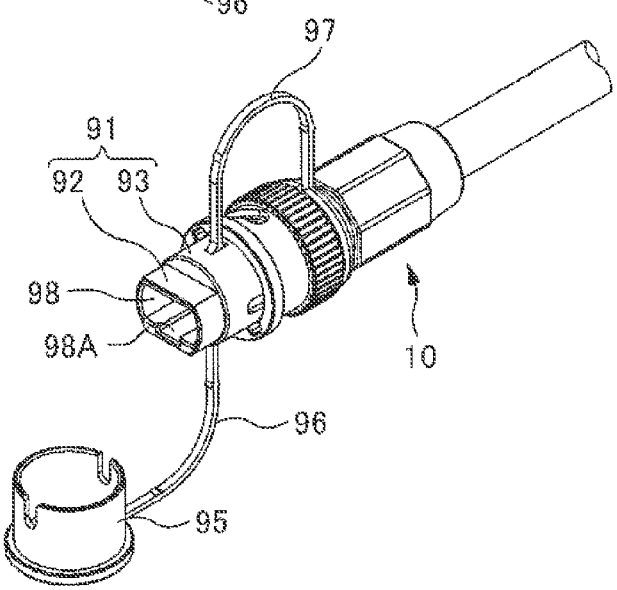

FIGS. 17A to 17C are explanatory diagrams showing the use of a plug-side attachment 90.

The attachment 90 includes: an attachment main body 91; a cap 95; a linking section 96; and an attaching section 97. The attachment main body 91 includes a guiding hole 98 which guides the extending section 6 of the cleaning tool 1, and is a portion which is fitted to the coupling device 20 of the optical connector 10. The cap 95 is a cover of the guiding hole 98 of the attachment main body 91. The linking section 96 links the attachment main body 91 and the cap 95. The attaching section 97 is a portion for attaching the attachment 90 to the optical connector 10. The attachment 90 is formed as a single unit and is made of resin, and the attachment main body 91 is formed as a single piece with the cap 95, the linking section 96 and the attaching section 97.

As shown in FIG. 17A, the attaching section 97 includes a C-shaped portion having a slit, and by opening the slit, the attachment 90 can be attached to and detached from the optical connector 10. As shown in FIG. 17C, the cap 95 can be removed with the attachment main body 91 remaining attached to the optical connector 10. Since the cap 95 is linked to the attachment main body 91 by the linking section 96, the loss of the removed cap 95 can be avoided. If the cap 95 is removed, the cleaning tool 1 can be inserted to the attachment main body 91. As shown in FIG. 17B, if the guiding hole 98 is covered with the cap 95, dust, oil and the like from the guiding hole 98 can be blocked and contamination of the ferrule 30 can be prevented.

Figure 18:
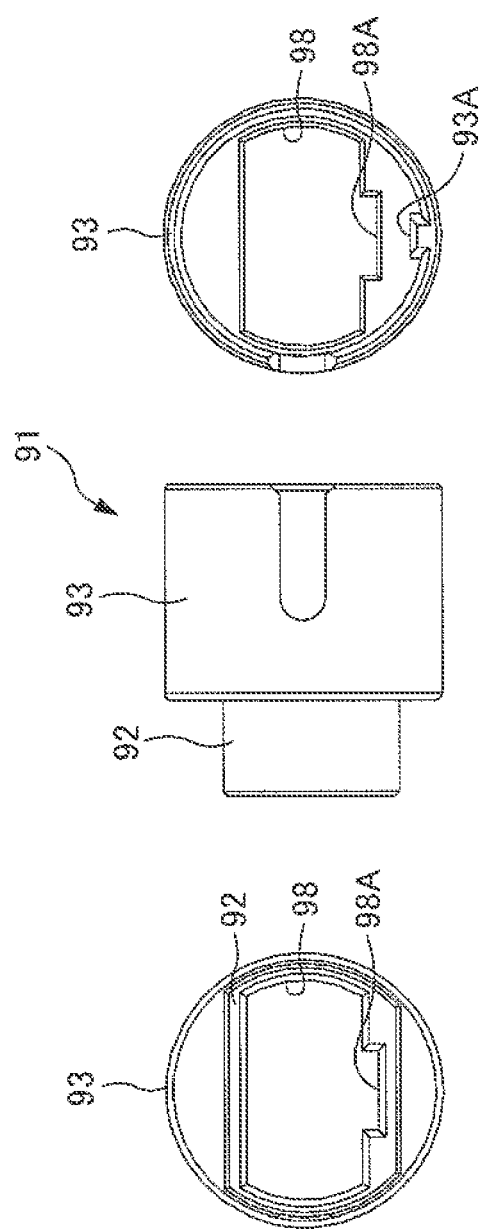
FIG. 18 is an explanatory diagram (orthogonal projection) of the shape of the attachment main body 91.
Figure 19A:
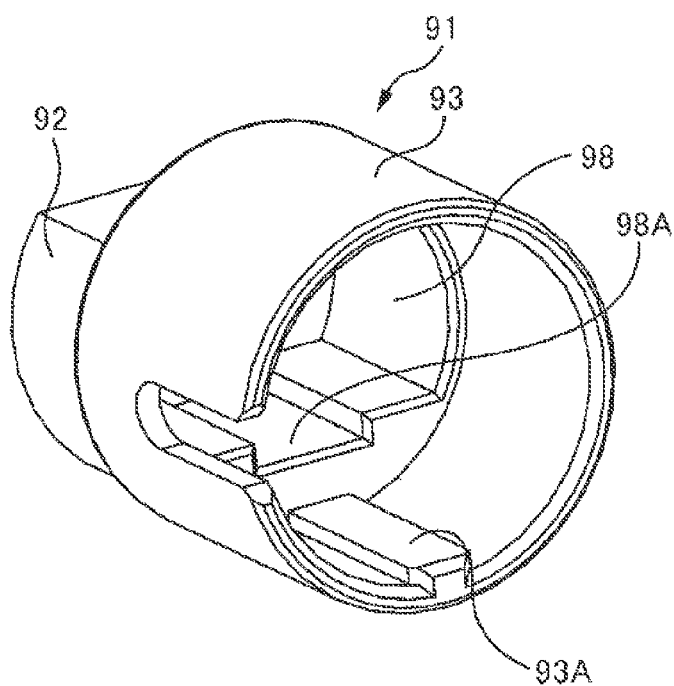
FIG. 19A is a perspective view of the attachment main body 91 as viewed obliquely from the rear.
Figure 19B:
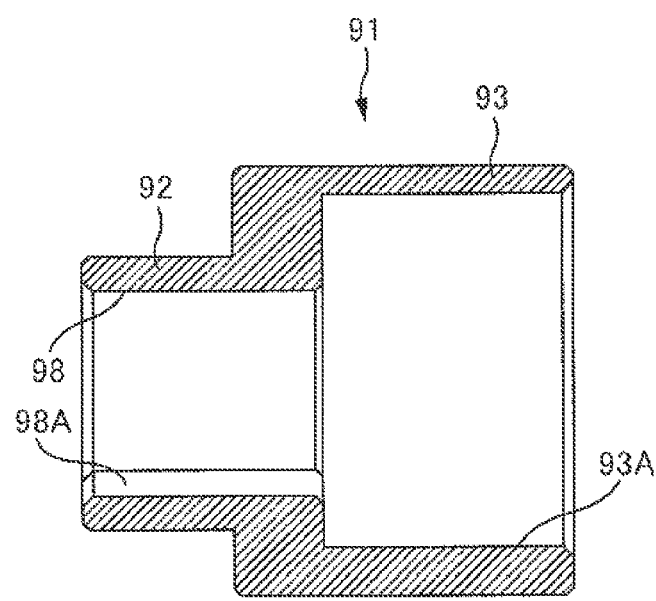
FIG. 19B is a cross-sectional view of the attachment main body 91.

FIG. 18 is an explanatory diagram (orthogonal projection) of the shape of the attachment main body 91. FIG. 19A is a perspective view of the attachment main body 91 as viewed obliquely from the rear. FIG. 19B is a cross-sectional view of the attachment main body 91. For illustrating the shape of the attachment main body 91, the cap 95 and the linking section 96 are omitted in the figure.

The attachment main body 91 includes: a guiding section 92; and a fitted section 93.

The guiding section 92 is a portion including the guiding hole 98, and is located in the front side of the attachment main body 91. Whereas in the second embodiment mentioned above, the guiding hole 98 is formed inside the portion which is fitted to the coupling device 120 of the optical connector 110 (the inner fitted section 192), in the third embodiment, the guiding hole 98 is formed in the guiding section 92 which is located in front of the fitted section 93.

The fitted section 93 is a cylindrical portion which is fitted to the coupling device 20 of the optical connector 10, and is located in the rear side of the attachment main body 91. Between the rotation section 21 and the inserted section 25 of the coupling device 20 of the plug-side optical connector 10, an annular space is located into which the cylindrical main body 121 of the coupling device 120 of the receptacle-side optical connector 110 is inserted. The cylindrical fitted section 93 of the attachment main body 91 is fitted to the foregoing annular space. Inside the fitted section 93, a projection 93A is formed protruding inwardly, and the projection 93A mates with the groove 25A of the inserted section 25 of the plug-side optical connector 10 (a groove for mating with on the receptacle side inner projection 122B).

The receptacle-side optical connector 110 of the second embodiment is a female connector, and the cylindrical main body 121 of the coupling device 120 has a large inside diameter. The inner fitted section 192 having the guiding hole 198 can therefore be inserted into the cylindrical main body 121 of the coupling device 120. As opposed thereto, the plug-side optical connector 10 of the third embodiment is a male connector (the inserted section 25 of the coupling device 20 of the optical connector 10 has a male form), and the inserted section 25 of the coupling device 20 has a small diameter. A portion in which the guiding hole 98 of the attachment main body 91 is formed is therefore difficult to be placed inside the inserted section 25 of the coupling device 20. In the attachment main body 91 of the third embodiment, a portion which is fitted to the optical connector 10 (the fitted section 93) and a portion including the guiding hole 98 (the guiding section 92) are therefore placed separately in front-rear direction. This enables the guiding hole 98 of the attachment main body 91 to guide the tip end of the extending section 6 of the cleaning tool 1 even through the attachment cannot be placed inside the inserted section 25 in which the ferrule 30 is placed.

The guiding hole 98 is a hole for guiding the tip end of the extending section 6 of the cleaning tool 1. In the third embodiment, when cleaning with the cleaning tool 1 the ferrule 30 in the optical connector 10, the operator inserts the head 7 of the extending section 6 of the cleaning tool 1 into the guiding hole 98 of the attachment main body 91 while mating the extending section 6 of the cleaning tool 1 with the guiding hole 98 of the attachment main body 91. This makes it possible to prevent misalignment between the cleaning unit 2 of the head 7 and the end face of the ferrule 30 of the optical connector 10, in the third embodiment.

A keyway 98A is formed in the lower part of the guiding hole 98. The reason that the position of the keyway 98A in the up-down direction is opposite to the receptacle-side attachment 190 is that the inclination of the end face of the ferrule 30 of the plug-side optical connector 10 is opposite to the inclination of the end face of the ferrule 130 of the receptacle-side optical connector 110. In the third embodiment, the keyway 98A allows the operator to insert the head 7 of the cleaning tool 1 into the attachment main body 91 appropriately in the up-down direction of the cleaning tool 1.

Others

The above-described embodiment is merely for facilitating the understanding of the invention, but is not meant to be interpreted in a manner limiting the scope of the invention. The invention can of course be altered and improved as in the following description, for example, without departing from the gist thereof and includes functional equivalents.

Metal Half Member 60

In the foregoing embodiments, the two metal half members 60 are affixed to the coupling device 20 while holding the housing 40 between the metal half members 60 and the coupling device 20 (the outer housing 23). However, a metal member which is affixed to the coupling device 20 while holding the housing 40 between itself and the coupling device 23 does not have to be either of upper or lower one of a two-part division. Such a metal member may be, for example, a metal cylindrical member including a hole which fibers pass through. But, if a metal member is one of a two-part division as described in foregoing embodiments is useful when the optical connector is assembled.

Metal Pin 80

In the foregoing embodiments, by the metal pin 80, the coupling device 20 (the outer housing 23) and the metal half member 60 are affixed. However, a method for affixing the coupling device 20 and the metal half member 60 is not limited thereto. The coupling device 20 and the metal half member 60 may be directly affixed by the following means: forming an engaging section (e.g., claw section) on the coupling device 20; forming an anchor section on the metal half member 60; and hooking the engaging section of the coupling device 20 to the anchor section of the metal half member 60.

REFERENCE SIGNS LIST 1 cleaning tool, 2 cleaning unit, 4 tool body,
6 extending section, 7 head, 8 protuberance,
10 optical connector (plug side),
20 coupling device, 21 rotation section,
21A receiving section, 21B anchor section,
23 outer housing, 23A pin hole,
24 housing accommodating section, 24A alignment surface, 24B keyway,
25 inserted section, 25A groove,
30 ferrule, 31 guide hole, 32 boot,
40 housing,
40A ferrule accommodating section, 40B spring accommodating section,
41 window section, 42 protrusion, 43 contact surface,
44 rear-end face, 45 alignment key,
50 floating mechanism, 52 coil spring,
54 catch, 56 engaging member,
57 receiving section, 58 arm section, 58A claw section,
60 metal half member, 62 housing holder,
64 optical-fiber passing section, 66 pin hole, 68 tapered section,
70 fastening device, 72 outer fastening device,
74 inner fastening device, 80 metal pin,
90 attachment (plug side),
91 attachment main body, 92 guiding section,
93 fitted section, 93A projection,
95 cap, 96 linking section, 97 attaching section,
98 guiding hole, 98A keyway
110 optical connector (receptacle side),
120 coupling device, 121 main body,
122 projection, 122A outer projection, 122B inner projection,
130 ferrule, 131 guide pin, 140 housing
190 attachment (receptacle side),
191 attachment main body,
192 inner fitted section, 192A groove,
193 outer fitted section, 193A groove(notch),
195 cap, 196 linking section,
198 guiding hole, 198A keyway

What is claimed is:

1. An optical connector, comprising:
    a coupling device
        that is made of metal, and
        that is to be coupled to a coupling mechanism of another optical connector that is to be coupled with the optical connector;
    a ferrule;
    a housing that is made of resin and that is accommodated by the coupling device while accommodating the ferrule in such a manner that the ferrule can move rearward; and
    a metal member that is affixed to the coupling device while holding the housing between the metal member and the coupling device,
    wherein a metal pin affixes between the coupling device and the metal member.

2. An optical connector according to claim 1, wherein the metal pin is placed perpendicular to a direction of attaching/detaching.

3. An optical connector according to claim 1, wherein
    when a side closer to an end face of the ferrule is defined as front and an opposite side is defined as rear,
    an alignment surface that faces rearward is formed in an accommodating section of the coupling device, the accommodating section accommodating the housing,
    a contact surface that faces forward is formed on the housing, and
    the housing is accommodated by the coupling device while the contact surface being in contact with the alignment surface.

4. An optical connector according to claim 1, wherein
    a difference between a Young's modulus of the housing and a Young's modulus of the ferrule is smaller than a difference between a Young's modulus of the coupling device and the Young's modulus of the ferrule.

5. An optical connector according to claim 1, wherein
    the optical connector further includes an attachment including an attachment main body that can be attached to and detached from the optical connector, and
    a guiding hole is formed on the attachment main body, the guiding hole guiding an end section of a cleaning tool that cleans the ferrule.

6. An optical connector according to claim 5, wherein the optical connector further comprises a cap for covering the guiding hole.

7. An optical connector according to claim 6, wherein the optical connector further comprises a linking section which links the attachment main body and the cap.

8. An optical connector according to claim 5, wherein a keyway is formed in the guiding hole, the keyway being for mating with a protuberance formed on the end section of the cleaning tool.

9. An optical connector according to claim 5, wherein
    the optical connector is a male connector including an inserted section that is inserted into a female connector, and
    the attachment main body includes
        a fitted section that is fitted outside the inserted section of the optical connector and
        a guiding section in which the guiding hole is formed.

* * * * *